(12) United States Patent
Azvine et al.

(10) Patent No.: US 10,592,516 B2
(45) Date of Patent: Mar. 17, 2020

(54) ANOMALY DETECTION BY MULTI-LEVEL TOLERANCE RELATIONS

(71) Applicant: British Telecommunications Public Limited Company, London (GB)

(72) Inventors: Benham Azvine, London (GB); Trevor Martin, London (GB)

(73) Assignee: British Telecommunications Public Limited Company, London (GB)

( * ) Notice: Subject to any disclaimer, the term of this patent is extended or adjusted under 35 U.S.C. 154(b) by 211 days.

(21) Appl. No.: 15/562,095

(22) PCT Filed: Mar. 22, 2016

(86) PCT No.: PCT/EP2016/056284
§ 371 (c)(1),
(2) Date: Sep. 27, 2017

(87) PCT Pub. No.: WO2016/156115
PCT Pub. Date: Oct. 6, 2016

(65) Prior Publication Data
US 2018/0075038 A1    Mar. 15, 2018

(30) Foreign Application Priority Data

Mar. 27, 2015  (EP) ..................................... 15161343

(51) Int. Cl.
*G06F 16/2457*   (2019.01)
*G06N 20/00*     (2019.01)
(Continued)

(52) U.S. Cl.
CPC .... *G06F 16/24578* (2019.01); *G06F 11/3072* (2013.01); *G06F 16/22* (2019.01);
(Continued)

(58) Field of Classification Search
CPC ............... G06F 16/24578; G06F 16/22; G06F 11/3072; G06N 20/00; G06Q 10/06; G06Q 10/063; G06Q 10/067; G06Q 30/02
(Continued)

(56) References Cited

U.S. PATENT DOCUMENTS 6,256,617 B1   7/2001 Cuce'
8,494,985 B1   7/2013 Keralapura et al.
(Continued)

FOREIGN PATENT DOCUMENTS

WO    WO 2018/104321    6/2018

OTHER PUBLICATIONS

U.S. Appl. No. 15/024,572, filed Mar. 24, 2016, Inventors: Azvine et al.
(Continued)

*Primary Examiner* — Dung K Chau
(74) *Attorney, Agent, or Firm* — Patterson Thuente Pedersen, P.A.

(57) ABSTRACT

A method for partitioning a plurality of entities each associated with a plurality of ordered sequences of events received by a computer system, the method including: defining a minimal directed acyclic graph data structure representing the sequences of events to define a plurality of categories of behavior of the entities; defining a threshold degree of similarity as an xmu number, the xmu number having cardinality that is able to vary across a normalized range; defining a relation for each entity including a degree of association of the entity with each of the categories; defining a cluster of entities as a set of entities comprising a first entity; comparing a relation for the first entity with a relation for a second entity to define a xmu Jaccard similarity coefficient for the first and second entities; and responsive to
(Continued)

the coefficient meeting the threshold degree of similarity, adding the second entity to the cluster.

8 Claims, 16 Drawing Sheets

(51) Int. Cl.
<table>
<tr><td>G06F 16/22</td><td>(2019.01)</td></tr>
<tr><td>G06F 16/2458</td><td>(2019.01)</td></tr>
<tr><td>G06F 11/30</td><td>(2006.01)</td></tr>
<tr><td>G06Q 30/02</td><td>(2012.01)</td></tr>
<tr><td>G06Q 10/06</td><td>(2012.01)</td></tr>
</table>

(52) U.S. Cl.
CPC ......... *G06F 16/2468* (2019.01); *G06N 20/00* (2019.01); *G06Q 10/06* (2013.01); *G06Q 10/063* (2013.01); *G06Q 10/067* (2013.01); *G06Q 30/02* (2013.01)

(58) Field of Classification Search
USPC .............. 707/737, 999.005; 705/14.66, 7.33; 706/14, 50
See application file for complete search history.

(56) References Cited

U.S. PATENT DOCUMENTS

| | | |
|---|---|---|
| 2002/0156587 A1 | 10/2002 | Woolf |
| 2007/0209074 A1 | 9/2007 | Coffman |
| 2008/0109454 A1 | 5/2008 | Willse et al. |
| 2008/0288482 A1* | 11/2008 | Chaudhuri ........ G06F 16/24556 |
| 2010/0011410 A1 | 1/2010 | Liu |
| 2011/0145185 A1 | 6/2011 | Wang et al. |
| 2012/0166372 A1* | 6/2012 | Ilyas ........................ G06N 5/02 706/14 |
| 2013/0006915 A1 | 1/2013 | Gunawardana et al. |
| 2013/0066823 A1* | 3/2013 | Sweeney .................. G06N 5/02 706/50 |
| 2014/0095425 A1 | 4/2014 | Sipple |
| 2014/0279757 A1 | 9/2014 | Shimanovsky et al. |
| 2014/0373031 A1 | 12/2014 | Ide et al. |
| 2015/0220951 A1* | 8/2015 | Kurapati ............ G06Q 30/0204 705/7.33 |
| 2015/0220999 A1* | 8/2015 | Thornton ........... G06Q 30/0201 705/14.66 |
| 2016/0232032 A1 | 8/2016 | Azvine et al. |
| 2016/0239660 A1* | 8/2016 | Azvine .................. G06Q 10/04 |

OTHER PUBLICATIONS

U.S. Appl. No. 15/024,555, filed Mar. 24, 2016, Inventors: Azvine et al.
Marceu, Carla, "Characterizing the Behavior of a Program Using Multiple-Length N-Grams", Odyssey Research Associates', Sep. 18, 2000, 11 pages.
Apostolico et al., "Searching for Ephemeral Subsequences in Strings", Computer Science Technical Reports, Purdue e-Pubs, Department of Computer Science, Purdue University, Dec. 1996, 13 pages.
A.L. Barabasi, "The origin of bursts and heavy tails in human dynamics", Nature, pp. 207-211, 2005.
International Search Report for PCT/EP2016/056284, dated May 19, 2016, 3 pages.
Written Opinion of the International Searching Authority for PCT/EP2016/056284, dated May 19, 2016, 7 pages.
Ganter, Bernard; "Formal Concept Analysis: Methods and Applications in Computer Science"; Summer 2002; 93 pages.
Martin, T. P.; "The X-mu Representation of Fuzzy Sets—Regaining the Excluded Middle"; Intelligent Systems Laboratory University of Bristol, Bristol, BS8 1TR UK; 978-1-4799-1568-2/13; 2013 IEEE; 7 pages.
Kruse, et al.; Texts in Computer Science; "Computational Intelligence A Methodological Introduction"; DOI 10.1007/978-1-4471-5013-8, Springer-Verlag London 2013; 482 pages.
Manning et al.; "Introduction to Information Retrieval"; Cambridge University Press; P1: KRU/IRP irbook CUUS232/Manning 978 0 521 86571 5; May 27, 2008; 504 pages.
Ganter et al.; "Finger Exercises in Formal Concept Analysis" Institut fur Algebra TU Dresden, D-01062 Dresden ICCL Summer School, Jun./Jul. 2006; 113 pages.
U.S. Appl. No. 16/466,828, filed Jun. 5, 2019, Inventors: Azvine et al.
PCT International Search Report and Written Opinion for Application No. PCT/EP2017/081557, dated Mar. 5, 2018 (9 pgs).

\* cited by examiner

FIGURE 6a
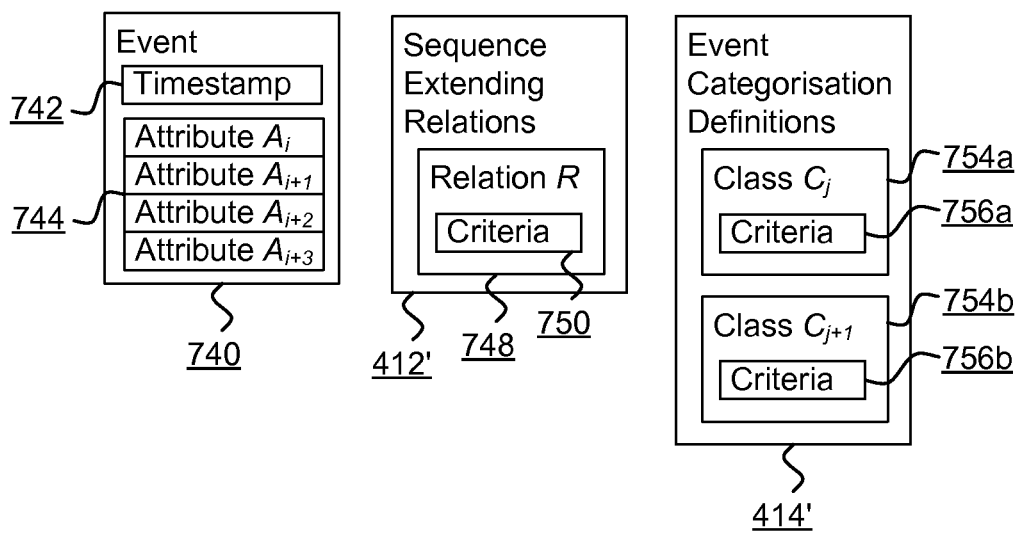
FIGURE 6b
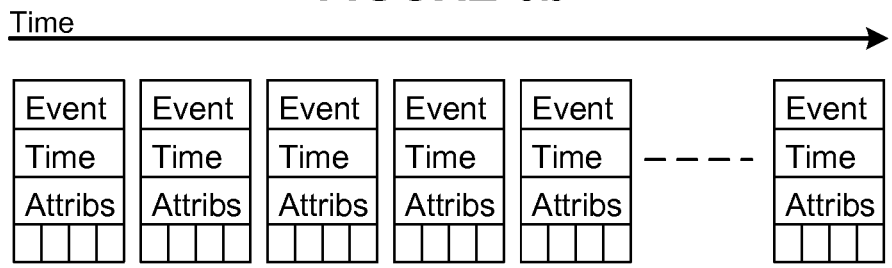
FIGURE 6c FIGURE 6d FIGURE 6e
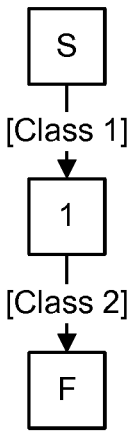 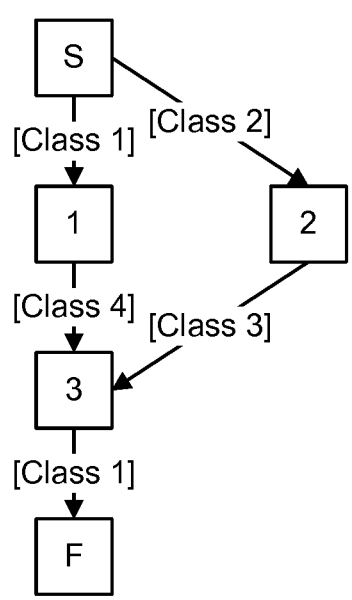 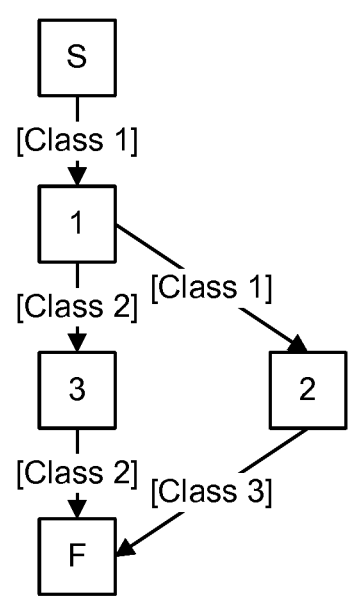

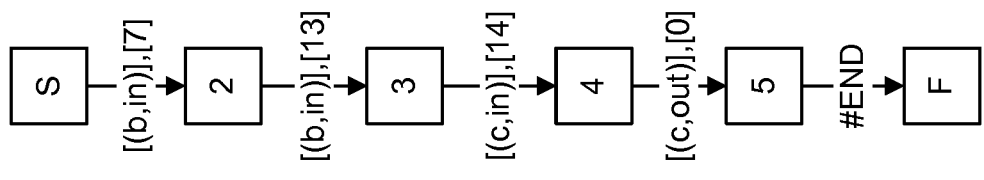

ANOMALY DETECTION BY MULTI-LEVEL TOLERANCE RELATIONS

CROSS-REFERENCE TO RELATED APPLICATIONS

The present application is a National Phase entry of PCT Application No. PCT/EP2016/056284, filed on 22 Mar. 2016, which claims priority to EP Patent Application No. 15161343.7, filed on 27 Mar. 2015, which are hereby fully incorporated herein by reference.

TECHNICAL FIELD

The present disclosure relates to sequence identification for events. In particular it relates to representing event sequences for efficient filtering of incoming events and prediction of future events.

BACKGROUND

As the generation of information proliferates, vast quantities of data are created by systems, software, devices, sensors and all manner of other entities. Some data is intended for human review, problem identification or diagnosis, scanning, parsing or mining. As data sets are generated and stored in greater quantities, at greater rates, and with potentially greater levels of complexity and detail, the "big data" problem of storing, handling, processing or using the data arises.

Specifically, it can be problematic to identify meaning within data, or to identify relationships between data items in large or complex data sets. Further, data can be generated in real-time and received by data storage components or data processing components at regular or variable intervals and in predetermined or variable quantities. Some data items are generated over time to indicate, monitor, log or record an entity, occurrence, status, event, happening, change, issue or other thing. Such data items can be collectively referred to as 'events'. Events include event information as attributes and have associated a temporal marker such as a time and/or date stamp. Accordingly, events are generated in time series. Examples of data sets of events include, inter alia: network access logs; software monitoring logs; processing unit status information events; physical security information such as building access events; data transmission records; access control records for secured resources; indicators of activity of a hardware or software component, a resource or an individual; and profile information for profiling a hardware or software component, a resource or an individual.

Events are discrete data items that may or may not have association directly or indirectly with other events. Determining relationships between events requires detailed analysis and comparison of individual events and frequently involves false positive determinations of relationship leading to inappropriate conclusions. Statistical methods such as time-series analysis and machine learning approaches to the modeling of event information are not ideally suited because they require numerical features in many cases, and because they typically seek to fit data to known distributions. There is evidence that human behavior sequences can differ significantly from such distributions—for example, in sequences of asynchronous events such as the sending of emails, exchange of messages, human controlled vehicular traffic, transactions and the like. In the paper "The origin of bursts and heavy tails in human dynamics," (A. L. Barabasi, Nature, pp. 207-211, 2005), Barabasi showed that many activities do not obey Poisson statistics, and consist instead of short periods of intense activity which may be followed by longer periods in which there is no activity.

A related problem with statistical approaches and machine learning is that such approaches generally require a significant number of examples to form meaningful models. Where a new behavior pattern occurs (for example, in network intrusion events) it may be important to detect it quickly (i.e. before a statistically significant number of incidents have been seen). A malicious agent may even change the pattern before it can be detected.

The identification of sequences of events is a widespread and unsolved problem. For example, internet logs, physical access logs, transaction records, email and phone records all contain multiple overlapping sequences of events related to different users of a system. Information that can be mined from these event sequences is an important resource in understanding current behavior, predicting future behavior and identifying non-standard patterns and possible security breaches.

SUMMARY

The present disclosure accordingly provides, in a first aspect, a method for partitioning a plurality of entities each associated with one or more ordered sequences of events received by a computer system, the method comprising: defining a minimal directed acyclic graph data structure representing the sequences of events to define a plurality of categories of behavior of the entities; defining a threshold degree of similarity as an xmu number, the xmu number having cardinality that is able to vary across a normalized range; defining a relation for each entity including a degree of association of the entity with each of the categories; defining a cluster of entities as a set of entities comprising a first entity; and comparing a relation for the first entity with a relation for a second entity to define a xmu Jaccard similarity coefficient for the first and second entities; responsive to the coefficient meeting the threshold degree of similarity, adding the second entity to the cluster.

In some embodiments, the coefficient is a first coefficient and the method further comprising: comparing a relation for a third entity with a relation for one or more of the first and second entities to define one or more further xmu Jaccard similarity coefficients; and adding the third entity to the cluster in response to one or more of the further coefficients meeting the threshold degree of similarity.

In some embodiments, each category of behavior is defined based on a path through the directed acyclic graph data structure from a start node in the graph to an end node in the graph.

In some embodiments, the relation for each entity includes a measure of membership of the entity with each of the categories.

In some embodiments, each measure of membership for an entity with a category is determined based on a frequency of events associated with the entity that correspond to a path in the directed acyclic graph defining the category.

In some embodiments, the method further comprises: receiving subsequent events for the first entity; updating the minimal directed acyclic graph data structure to additionally represent the sequences of subsequent events to define a plurality of categories of behavior of the entities; redefining the relation for the first entity including a degree of association of the entity with each of the categories; comparing the redefined relation for the first entity with one or more of the original relation for the first entity and the relation of the second entity to define one or more xmu Jaccard similarity coefficients; responsive to the coefficient failing to meet the threshold degree of similarity, identifying the entity as a suspicious entity.

The present disclosure accordingly provides, in a second aspect, a computer system comprising: a memory; and a processor, wherein the processor is adapted to perform a method for partitioning a plurality of entities each associated with one or more ordered sequences of events received by a computer system, the method comprising: defining a minimal directed acyclic graph data structure representing the sequences of events to define a plurality of categories of behavior of the entities; defining a threshold degree of similarity as an xmu number, the xmu number having cardinality that is able to vary across a normalized range; defining a relation for each entity including a degree of association of the entity with each of the categories; defining a cluster of entities as a set of entities comprising a first entity; and comparing a relation for the first entity with a relation for a second entity to define a xmu Jaccard similarity coefficient for the first and second entities; responsive to the coefficient meeting the threshold degree of similarity, adding the second entity to the cluster.

In accordance with a fifth aspect the present disclosure accordingly provides a computer program element comprising computer program code to, when loaded into a computer system and executed thereon, cause the computer to perform the computer implemented method as described above.

BRIEF DESCRIPTION OF THE DRAWINGS

An embodiment of the present disclosure will now be described, by way of example only, with reference to the accompanying drawings, in which:

FIGS. 6a to 6e are component diagram illustrating exemplary data structures employed and generated by the embodiments of FIGS. 2 to 5.

FIG. 9 is an AllowedActions table in accordance with an exemplary embodiment of the present disclosure.

FIG. 10 is a directed acyclic graph representation of a first sequence in accordance with the exemplary embodiment of the present disclosure.

DETAILED DESCRIPTION

Figure 1:
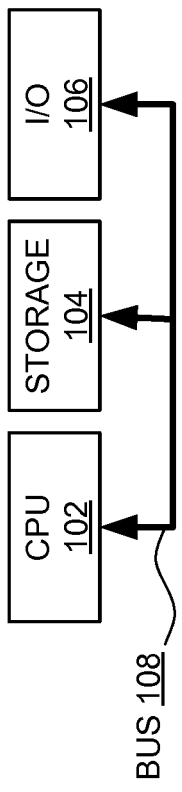
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
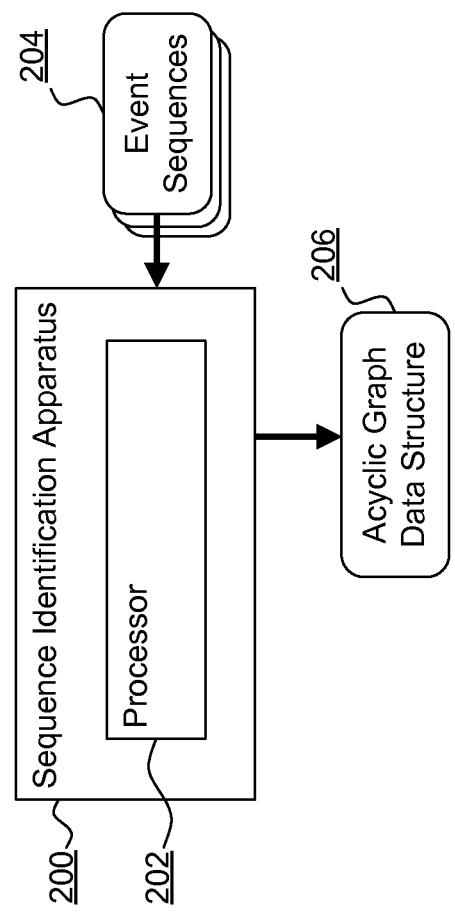
FIG. 2 is a component diagram of a sequence identification apparatus for identifying sequences in a plurality of events in accordance with an embodiment of the present disclosure.

FIG. 2 is a component diagram of a sequence identification apparatus 200 for identifying sequences in a plurality of events in accordance with one embodiment of the present disclosure. The sequence identification apparatus 200 includes a processor 202 for undertaking all or part of the function of the apparatus. Various functions and components of the sequence identification apparatus 200 will be described below with respect to multiple embodiments of the present disclosure and it will be appreciated by those skilled in the art that the processor 202 may be adapted to carry out, perform, constitute or encapsulate one or more such functions and components in various configurations. For example, the processor 202 can be one or more CPUs such as CPU 102 of a generalized computing device such as that depicted in FIG. 1. Accordingly the particular embodiments depicted herein are purely exemplary and any suitable configuration of components could alternatively be employed.

The sequence identification apparatus 200 is adapted to receive event sequences 204 as sequences of events from a plurality of time-ordered events. The plurality of time-ordered events can be stored in a data structure, table, database or similar, or alternatively the events can be received as a stream of events. The plurality of time ordered events is used to identify the event sequences 204 based on defined sequence extending relations as described below. The event sequences 204 can be determined by a component external to the sequence identification apparatus 200, such as an event sequence identifier, or alternatively the event sequences 204 can be determined by the sequence identification apparatus 200 itself.

The sequence identification apparatus 200 is further adapted to determine an equivalence class for each event in each of the event sequences 204. An equivalence class is a class or type of event defined by one or more event categorization definitions and serves to classify or categorize events. In one embodiment the sequence identification apparatus 200 is adapted to determine the equivalence class itself for each event, based on one or more event categorization definitions as described below. In an alternative embodiment, the sequence identification apparatus 200 determines an equivalence class for an event by receiving an equivalence class for the event from a component external to the sequence identification apparatus 200.

The sequence identification apparatus 200 is further adapted to generate a directed acyclic graph (DAG) data structure 206 as a data structure representation of equivalence classes for a first one of the event sequences 204. For example, the DAG data structure 206 can be a data structure stored in a storage 104 of a computer system, such as a storage associated or comprised with the sequence identification apparatus 200. In one embodiment the DAG data structure 206 is stored using data structure elements as nodes having memory pointers for providing links between nodes as edges of the DAG. Exemplary embodiments of the DAG data structure 206 are detailed below.

The sequence identification apparatus 200 is further adapted to add a representation of one or more further event sequences 204 to the DAG data structure. Thus, the sequence identification apparatus 200 receives one or more further event sequences 204 and modifies the DAG data structure 206 to include a representation of such further event sequences within the DAG. Equivalence classes for events in such further event sequences can be common. For example, equivalence classes for events at a beginning of a first event sequence can be common with equivalence classes for events at a beginning of a second event sequence. The sequence identification apparatus 200 combines such common sub-sequences represented in the DAG data structure 206 such that relationships between the first and second event sequences based on sub-sequences of events having common equivalence classes are represented in the DAG data structure 206. The sequence identification apparatus 200 is adapted to combine equivalence class representations in the DAG data structure 206 for initial and final sub-sequences of event sequences having common equivalence classes ('initial' being at the beginning of an event sequence, and 'final' being at the end of an event sequence).

Figure 3:
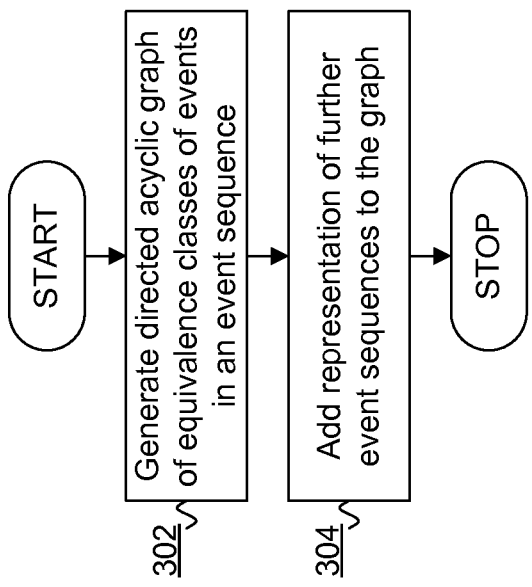
FIG. 3 is a flowchart of a method of the sequence identification apparatus of FIG. 2 in accordance with an embodiment of the present disclosure.

FIG. 3 is a flowchart of a method of the sequence identification apparatus 200 of FIG. 2 in accordance with an embodiment of the present disclosure. Initially, at 302, the sequence identification apparatus 200 generates a DAG data structure 206 of equivalence classes of events in an event sequence 204. Subsequently, at 304, the sequence identification apparatus 200 adds representations of further event sequences 204 to the DAG data structure 206. The addition, at 304, includes combining equivalence class representations in the DAG data structure 206 as described above.

The DAG data structure 206 generated by the sequence identification apparatus 200 includes a directed representation of equivalence classes for each of the event sequences 204. Such a representation is particularly advantageous for processing subsequently received streams of time-ordered events. Using such a DAG data structure 206 it is possible to efficiently filter incoming streams of time-ordered events to identify known sequences of events by traversing the DAG for new events. The DAG data structure 206 is particularly beneficial because it represents equivalence classes of events and so a filtering process based on the DAG is not hindered by an interpretation of the particular features of individual events, either in the plurality of events used to generate the DAG or a stream of incoming events. Further, such an approach to traversing the DAG for incoming events can be used to efficiently identify new sequences of events not correlating to the event sequences represented by the DAG. Such identifications can be useful where new sequences need to be identified. Yet further, the DAG data structure 206 allows for an efficient identification of new sequences having sub-sequences in common with existing sequences, such as new sequences of events having initial or final sub-sequences of events having common equivalence classes.

The DAG data structure 206 is further suitable for predicting future classes or types of event, and by extrapolation, the DAG can be used to predict one or more future events based on the event sequences used to generate the DAG. Where a path through the DAG data structure 206 is partially traversed in response to a sequence of incoming time-ordered events, one or more potential subsequent event classifications can be predicted based on the next elements in the DAG. Further, attributes for existing events in a sequence leading to such partial traversal of a path through the DAG can be used to generate one or more predicted events. Such predictions can be additionally based on sequence extending relations to inform a determination of attribute values for one or more predicted future events. For example, where the DAG data structure 206 represents event sequences of known attacks in a computer network intrusion detection system, with each event corresponding to a network action such as a network request, response, transmitted packet or other network occurrence, the DAG can be used to predict one or more future events from an incoming stream of events to identify a potential new attack before it occurs. Such early identification can be effective even if the incoming sequence of events is used to only partially traverse a path through the DAG. An extent of similarity of the equivalence classes for an incoming sequence of events with paths of equivalence classes in the DAG can be determined and, reactive to a threshold extent, predicted attacks can be identified.

The DAG data structure 206 is further suitable for identifying entities associated with events that may be related based on similarity of paths through the DAG data structure 206. For example, events relating to wholly different entities but being represented in the DAG using common graphs of event classifications (such as combined graphs or sub-graphs) can identify a relationship between the entities. Thus, where entities constitute physical objects, devices or people and events indicate a behavior, action, change or other occurrence relating to the entity, the DAG can be used to group entities due to event classification commonality. For example, time-stamped events can relate to employees accessing resources using a security facility, such as access to a secure building via a badge-locked door, or access to a secure network via an authentication system. Such events can include an indication of a type of occurrence, such as an "entry occurrence" and an "exit occurrence" indicating commencement and cessation of access to the resource. Further, events can include an identification of a resource being accessed, such as a building or network identifier. Sequences of such events can be identified using sequence extending relations between events such as identity of employee identifier and a temporal limitation. A DAG data structure 206 generated by the sequence identification apparatus 200 models equivalence classes of events in such sequences. Such classes can include, for example, classes characterized by the type of occurrence ("entry" or "exit"), the time of day (e.g. "morning" or "afternoon") and an identifier of a resource (building or network identifier). As sequences of events are represented in the DAG data structure 206, event sequences relating to different employees may be found to overlap in the DAG and are accordingly combined. Such employees can be identified as similar based on such combining. For example, employees who enter a particular building in the morning and leave the same building in the afternoon can be identified as a group of employees who work at only a single site. Other different such groups can also be discerned based on the DAG. The identification of groups of entities can be valuable in security applications where entities grouped with known threats can be subject to close scrutiny.

Figure 4:
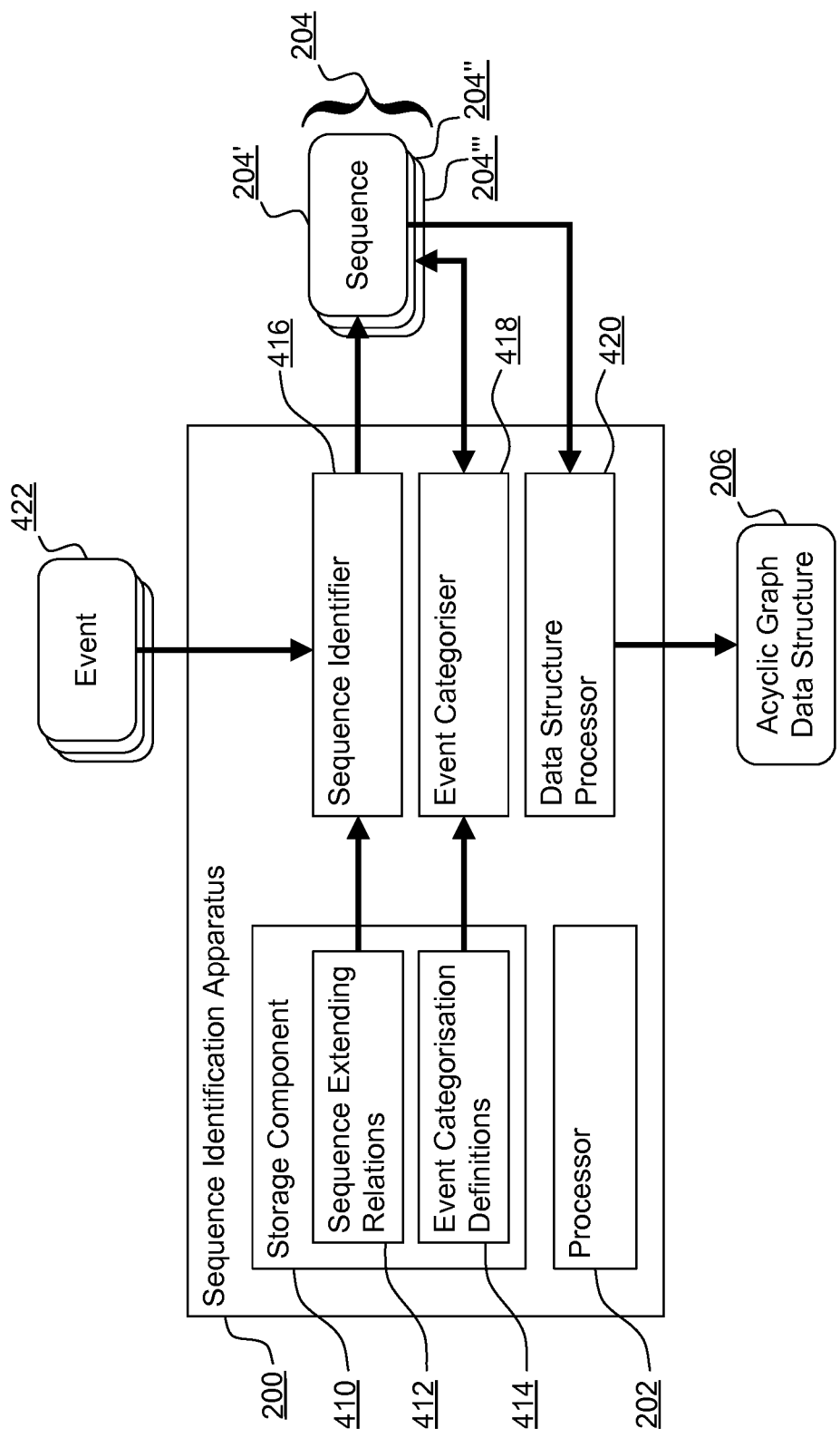
FIG. 4 is a component diagram of a sequence identification apparatus in use in accordance with one embodiment of the present disclosure.

FIG. 4 is a component diagram of a sequence identification apparatus 200 in use in accordance with one embodiment of the present disclosure. Certain of the elements of FIG. 4 are common with FIG. 2 as previously described and these will not be repeated here. The embodiment of FIG. 4 illustrates one exemplary implementation of the arrangement of FIG. 3 for the generation of the DAG data structure 206. The sequence identification apparatus 200 of FIG. 4 is adapted to receive a plurality of time-ordered events 422. Each event in the plurality of events 422 is a data item, data structure, message, record or other suitable means for recording an occurrence of the type, inter alia, previously described. Events 422 constitute data input into the sequence identification apparatus 200 and can be stored in a data store associated with, or communicable with, the apparatus 200. For example, the events 422 can be stored in a table data structure, database, file, message list or other suitable format. Alternatively, the events 422 can be received by the apparatus 200 individually or in batches over a communication mechanism such as a software or hardware interface or a network. Each of the events 422 includes temporal information such as a time and/or date stamp to indicate the position of the event in the time-ordered plurality of event. Such temporal information can be absolute or relative. Each of the events 422 has a plurality of fields, columns, elements, values, parameters or data items that shall be collectively referred to as attributes. Attributes can be identified by an attribute name, though an offset, address, indicator, identifier, look-up or other suitable means for consistently referencing a particular attribute of an event are also possible. In one embodiment, attributes are common to all events 422 such that each event has all attributes, and the domain of each attribute is the same for all events. In an alternative embodiment some events have attributes in addition to common attributes and a subset of attributes used for sequence generation and event classification are common to all events.

The sequence identification apparatus 200 further includes a storage component 410 storing one or more sequence extending relations 412 and one or more event categorization definitions 414. The sequence extending relations 412 are relations between events 422 based on common event attributes. In an event sequence 204, each event is related to a temporally preceding event by one or more sequence extending relation 412. A first event in an event sequence is not related to a preceding event. Thus, the sequence extending relations 412 serve to define a relationship between an event and a temporally later event to constitute all or part of an event sequence. One or more of the sequence extending relations 412 can be implemented as criteria, the satisfaction of which by a pair of events determines a relationship between the events. In one embodiment the criteria can be determinative of a relation. In an alternative embodiment, one or more of the sequence extending relations 412 can be implemented as a measurement of characteristics of a pair of events to determine a relationship between the events. In this way a fuzzy relation can be defined such that a relationship between events is based on one or more measures of characteristics based on attribute values of the events and one or more conditions or criteria relating to such measures. Thus, in such embodiments, one or more sequence extending relations 412 are defined such that a relation between events is determined based on a measure of a level of satisfaction of relational criteria and responsive to the measure meeting a predetermined threshold.

The event categorization definitions 414 define classes or types of events known as equivalence classes or event categories. Equivalence classes provide a mechanism for categorizing multiple events as "equivalent" events according to the event categorization definitions 414. The event categorization definitions 414 are based on event attributes common to all events. In one embodiment, each of the event categorization definitions 414 is defined by at least one criterion based on a plurality of common attributes. One or more of the event categorization definitions 414 can be implemented as one or more criteria, the satisfaction of which by an event can be used to determine that the event belongs to an equivalence class. In one embodiment the criteria can be determinative of a categorization of an event. In an alternative embodiment, one or more of the event categorization definitions 414 can be implemented as a measurement of characteristics of an event based on attributes of the event to determine one or more equivalence classes for the event. In this way a fuzzy association with equivalence classes can be defined such that an association between an event and equivalence classes is based on one or more measures of characteristics based on attribute values of the event and one or more conditions or criteria relating to such measures. Thus, in such embodiments, one or more event categorization definitions 414 are defined such that an equivalence class for an event is determined based on a measure of a level of satisfaction of the event with one or more criteria.

In use the sequence extending relations 412 are received by a sequence identifier 416. The sequence identifier is a hardware, software or firmware component adapted to identify event sequences 204 in the plurality of time-ordered events 422 based on the sequence extending relations 412. In one embodiment the sequence identifier 416 processes each event in the plurality of events 422 and applies criteria associated with each of the sequence extending relations 412 to determine if the event is related to a previous event. Related events are stored as event sequences 204 which can grow as more events in the plurality of events 422 are processed. It is conceivable that some events are not related to previous events and these may constitute the beginning of a new sequence. Further, some events may not appear in any of the sequences 204. Such events may be identified or flagged for further consideration. It will be appreciated by those skilled in the art that the sequence identifier 416 is operable to identify, monitor and track multiple potential or actual sequences contemporaneously so as to identify all event sequences 204 existing in the plurality of events 422 based on the sequence extending relations 412.

Further, in use the event categorization definitions 414 are received by an event categorizer 418. The Event categorizer is a hardware, software or firmware component adapted to determine an equivalence class for each event in each of the event sequences 204. In one embodiment the event categorizer 418 receives processes each event in each event sequence 204 and applies criteria associated with each of the event categorization definitions 414 to determine an appropriate equivalence class.

The sequence identification apparatus 200 further comprises a data structure processor 410 as a hardware, software or firmware component adapted to generate a DAG data structure 206 for each event in each of the event sequences 204. In an embodiment the DAG data structure 206 includes nodes and edges such that each edge corresponds to an equivalence class for an event in a sequence. Thus, in use, the data structure processor 420 generates an initial DAG data structure 206 for a first event sequence 204' including a plurality of graph edges each corresponding to an equivalence class for an event in the sequence. The edges connect nodes representative of, but not specifically associated with, the sequence extending relations 410 for the event sequence 204'. Consequently, after processing the first event sequence 204', the DAG data structure 206 is generated as a graph having a single straight path from a start node to an end node, with edges corresponding to equivalence classes for each event in the sequence joining nodes along the path. Subsequently, the data structure processor 420 processes further event sequences 204", 204'" adding a representation of each further event sequence 204", 204'" to the DAG data structure 206. In particular, where the data structure processor 420 determines that one or more initial and final sub-sequences of the first sequence 204' and further sequences 204", 204'" have common event categorization, the sub-sequences are combined in the DAG data structure 206. The DAG is therefore a minimal representation of the equivalence classes of the event sequences 204 where event sequences having sub-sequences of events with a series of common equivalence classes are merged and represented only once in the DAG data structure 206. Accordingly, the DAG data structure 206 can branch and join at points between a start node and an end node to define paths between the start node and end node.

It will be appreciated by those skilled in the art that, while the processor 202, sequence identifier 416, event categorizer 418 and data structure processor 420 are illustrated as separate components in FIG. 4, any or all of at least these components can be combined, merged, or further subdivided in embodiments of the present disclosure. For example, the sequence identifier 416 and the event categorizer 420 can be a single component. Further, the data structure processor 420 may be omitted with its functions performed by the processor 202 or any other suitable component of the sequence identification apparatus 200. It will further be appreciated that, while the storage component 410 is illustrated as being integral to the apparatus 200, the storage may alternatively be provided external to the apparatus 200 or as an integral part of a subcomponent of the apparatus 200. For example, the storage component 410 can be provided and maintained at an external device or apparatus communicatively connected to the sequence identification apparatus 200, such as by a software and/or hardware interface or a network.

Figure 5:
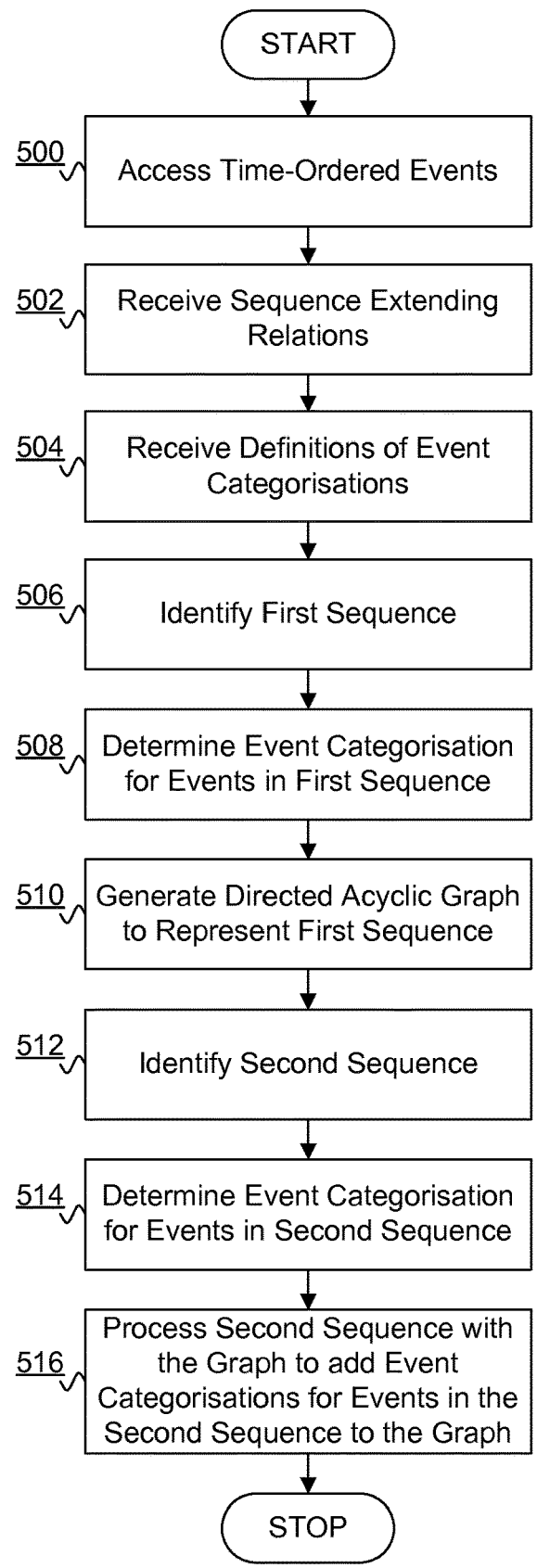
FIG. 5 is a flowchart of a method of the sequence identification apparatus of FIG. 4 in accordance with one embodiment of the present disclosure.

FIG. 5 is a flowchart of a method of the sequence identification apparatus 200 of FIG. 4 in accordance with one embodiment of the present disclosure. Initially, at 500, the sequence identifier 416 accesses time ordered plurality of events 422 such as by accessing a data store, database or table containing event records. At 502 the sequence identifier 416 receives sequence extending relations 412 from the storage component 410. At 504 the event categorizer 418 receives event categorization definitions 414 from the storage component 410. At 506 the sequence identifier 416 identifies a first event sequence 204' based on the sequence extending relations 412. At 508 the event categorizer 418 determines an equivalence class for each event in the first event sequence 204'. At 510 the data structure processor 420 generates a DAG data structure 206 of equivalence classes to represent the first sequence 204'. Subsequently, at 512, the sequence identifier 416 identifies at least one further event sequence 204" as a second event sequence 204". At 514 the event categorizer 418 determines an equivalence class for each event in the second event sequence 204". At 516 the data structure processor 420 processes the second event sequence 204" with the DAG data structure 206 to add equivalence classes for events in the second event sequence 204" to the DAG data structure 206.

It will be appreciated that the particular ordering of the flowchart steps illustrated in FIG. 5 and described above is not limiting and any other suitable steps and/or order of steps could alternatively be employed.

FIGS. 6a to 6e are component diagram illustrating exemplary data structures employed and generated by the embodiments of FIGS. 2 to 5. FIG. 6a illustrates an exemplary event data structure 740. The event 740 includes a timestamp 742 as an example of a temporal indicator. The timestamp 742 can indicate a time of generation, dispatch, receipt or other point in time applied consistently by all events in a plurality of events 422. The timestamp 742 provides a means by which the time-ordered nature of a plurality of events 422 can be determined and confirmed. For example, if a plurality of events 422 is not time-ordered, the timestamp 742 can be used to sort the events to provide a time-ordered plurality of events 422. The event 740 further includes a plurality of common attributes 744. The attributes 744 are common among all events in a plurality of events 422. All or a subset of the attributes 744 are used to define sequence extending relations 412. Further, all or a subset of the attributes 744 are used to define event categorization definitions 414. Each of the attributes 744 has a domain common to all events.

FIG. 6a further illustrates an exemplary sequence extending relations data structure 412'. The sequence extending relations data structure 412' includes a relation 748 defined by way of one or more criteria 750 based on event attributes 744. FIG. 6a further illustrates an exemplary event categorization definitions data structure 414'. The event categorization definitions data structure 414' includes a plurality of equivalence class definitions 754a, 754b each being defined by way of one or more criteria 756a, 756b based on event attributes 744.

FIG. 6b illustrates a plurality of time-ordered events 422, each including a timestamp 742 and attributes 744. The plurality of events 422 are illustrated as a stream of events which is one way the events can be received by the sequence identification apparatus 200. The plurality of events 422 can equally be stored in a table or other suitable data structure as described above.

FIG. 6c illustrates a first exemplary DAG data structure. The DAG of FIG. 6c represents equivalence classifications for at least one event sequence of two events, the second event being related to the first event by a sequence extending relation. A first event in the event sequence is represented as having an equivalence class "Class 1". A second event in the event sequence is represented as having an equivalence class "Class 2". The graph is delimited by predefined start and end nodes labeled "S" and "F" respectively. The relation between the events is indicated by the node "1" and the temporal relationship between the events in the event sequence provides a direction for the edges (equivalence classes) of the graph. Thus, FIG. 6c provides a DAG representation of an event sequence. Other event sequences having different events but having events with equivalence classifications according to the DAG of FIG. 6c can be said to be similar to the event sequence that was used to generate FIG. 6c.

FIG. 6d illustrates a second exemplary DAG data structure. The DAG of FIG. 6d shares some features with FIG. 6a, such as the start and end nodes. The DAG of FIG. 6d represents equivalence classifications for at least two event sequences, each of three events in length. A first event sequence includes events in time order having equivalence classes "Class 1", "Class 4" and "Class 1" respectively. A second event sequence includes events in time order having equivalence classes "Class 2", "Class 3" and "Class 1". The two event sequences overlap at sub-sequence at the end of each sequence, since the last event in both event sequences has equivalence class "Class 1". Thus, the DAG of FIG. 6d combines edges for the last event in each sequence between the node labeled "3" and the end node "F".

FIG. 6e illustrates a third exemplary DAG data structure. The DAG of FIG. 6e represents equivalence classifications for at least two event sequences where each of the event sequences overlap at a sub-sequence at the beginning of each sequence. Events at the beginning of both sequences are of equivalence class "Class 1". Thus, the DAG of FIG. 6e combines edges for the first event in each sequence between the start node "S" and the node labeled "1".

In one embodiment, the edges of the DAG data structure 206 are associated with events used in the generation of the DAG data structure 206 such that it is possible to relate an equivalence class representation in a DAG to events categorized to the equivalence class in a corresponding event sequence. For example, the DAG data structure 206 can be rendered for virtualization to a user for analysis, review or other reasons. A user can navigate to specific events in event sequences based on edges in the DAG using such an association. It will be apparent to those skilled in the art that the association can be unidirectional (e.g. DAG edges reference events or events reference DAG edges) or bidirectional.

Figure 7:
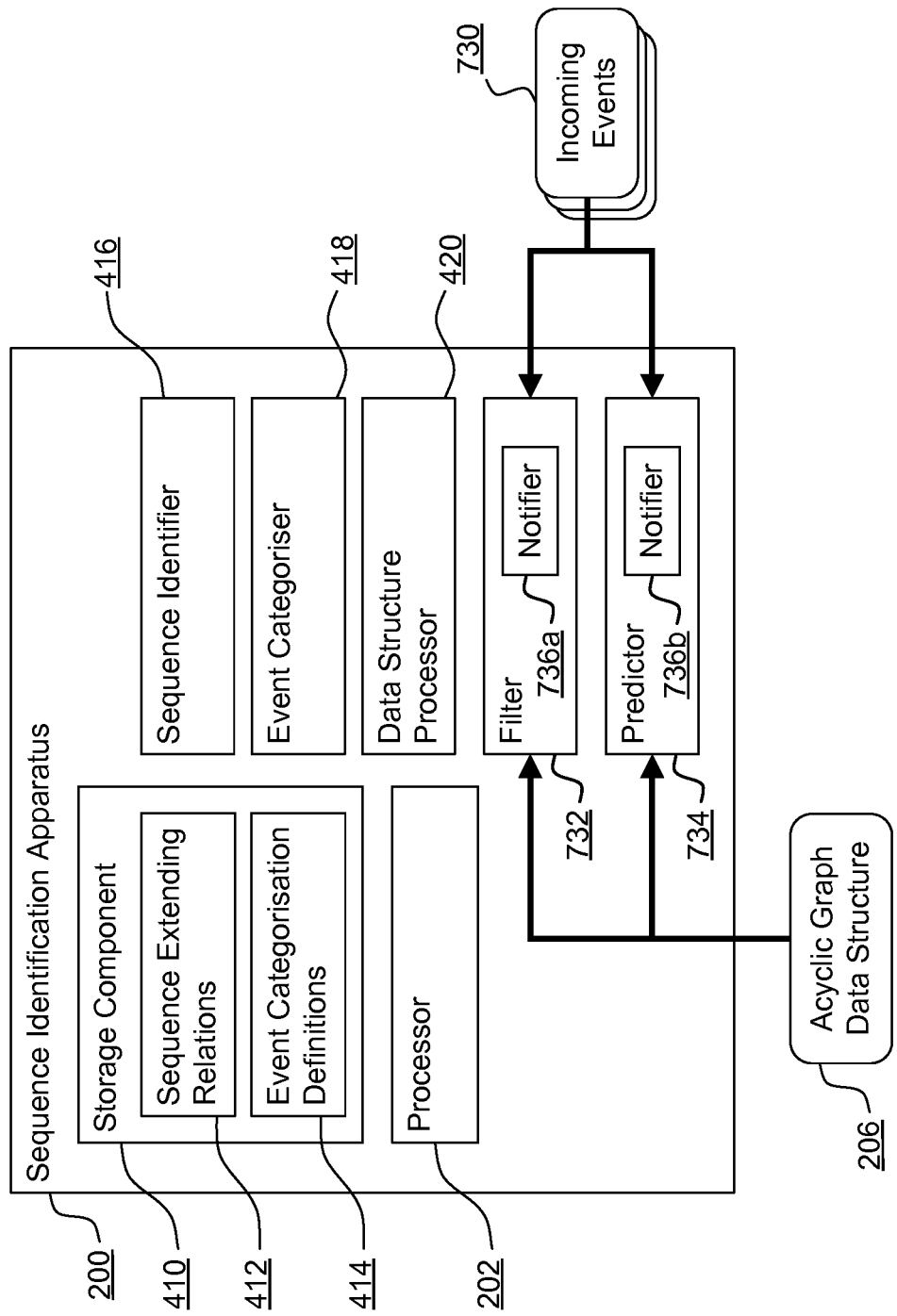
FIG. 7 is a component diagram of a sequence identification apparatus in use in accordance with an alternative embodiment of the present disclosure.

FIG. 7 is a component diagram of a sequence identification apparatus 200 in use in accordance with an alternative embodiment of the present disclosure. Many of the features of FIG. 7 are identical to those described above with respect to FIGS. 2 and 4 and these will not be repeated here. The sequence identification apparatus 200 of FIG. 7 further includes a filter 732 as a hardware, software or firmware component adapted to receive and filter incoming time-ordered events 730 based on a DAG data structure 206. The DAG data structure 206 is predefined according to the components, methods and techniques described above with respect to FIGS. 2 to 6. The incoming events 730 are new events for filtering by the filter 732. The filter 732 constitutes a component for employing a defined DAG data structure 206 to filter new incoming events 730. For example, the filter 732 is suitable for efficiently filtering an incoming stream of time-ordered events 730 to identify event sequences in the incoming stream of events 730 corresponding to sequences known from the DAG data structure 206. This is achieved by the filter 732 traversing the DAG data structure 732 for events in the incoming stream 730 where incoming events 730 satisfy sequence extending relations 412.

Thus, on receiving a new event from the stream of incoming events 730, the filter 732 operates in two respects: firstly, the filter 732 determines if the new event is related to a previously received event in accordance with the sequence extending relations 412; and secondly, the filter 732 determines if the new event corresponds to an equivalence class represented in the DAG data structure 206 as part of a path traversed through the DAG. In the first respect, the filter 732 can be adapted to store a record of all events as they are received in order to seek and identify previously received events with which a new event may be related. In the second respect, the filter 732 can be adapted to undertake and record potentially numerous traversals of the DAG data structure 206 simultaneously, each traversal corresponding to all partially received event sequences arising in the stream of incoming events 730. Thus the filter 730 can be provided with a memory, store, data area or similar for storing information about received events and for storing DAG traversal information for all partially received event sequences.

In this way the filter 732 provides an efficient way to identify known event sequences in the stream of incoming events 730 even where the event sequence arrives interspersed with other events or event sequences. Further, the filter 732 can be used to efficiently identify new sequences of events not correlating to the event sequences represented by the DAG. Such identifications can be useful where new sequences need to be identified, such as for addition to the DAG data structure 206. Alternatively, the identification of such new sequences can be used to identify atypical, suspicious, questionable or otherwise interesting sequences of events. For example, where a DAG data structure 206 is defined to represent acceptable sequences of events, a new sequence not conforming to any sequence represented by the DAG can be identified by the filter 732. It will be appreciated by those skilled in the art that the filter 732 can be adapted to traverse the DAG data structure 206 starting at a node or edge not at the beginning (or start) of the DAG such that new event sequences partially corresponding to a subsequence represented in the DAG data structure 206 can be identified.

In an embodiment the filter 732 is provided with a notifier 736a as a hardware, software or firmware component for generating a notification in response to the processing of the stream of incoming events 730. For example, where the filter 732 identifies a new event sequence not corresponding to any sequence represented by the DAG data structure 206, the notifier 736a can generate an appropriate notification. Additionally or alternatively, where the filter 732 identifies an event sequence corresponding or partially corresponding to a sequence represented by the DAG data structure 206, the notifier 736a can generate an appropriate notification.

The sequence identification apparatus 200 of FIG. 7 further includes a predictor 734 as a hardware, software or firmware component adapted to receive incoming time-ordered events 730 and predict one or more equivalent classes for future events or future events themselves based on the predefined DAG data structure 206.

On receiving a new event from the stream of incoming events 730, the predictor 734 operates in three respects: firstly, the predictor 734 determines if the new event is related to a previously received event in accordance with the sequence extending relations 412; secondly, the predictor 734 determines if the new event corresponds to an equivalence class represented in the DAG data structure 206 as part of a path traversed through the DAG; and thirdly the predictor 734 identifies one or more potential next equivalence classes from the DAG based on the path traversed through the DAG. In the first and second respects, the predictor 734 can be adapted to store a record of all events as they are received and undertake and record potentially numerous traversals of the DAG data structure 206 simultaneously, as is the case for the filter 732. Thus the predictor 732 can be provided with a memory, store, data area or similar for storing information about received events and for storing DAG traversal information for all partially received event sequences. In the third respect, the predictor 732 is adapted to determine one or more predicted equivalence classes from the DAG as outgoing edges from a current node in a traversal of the DAG data structure 206 for an event sequence received in the stream of incoming events 730. In the simplest case, the equivalence classes represented by outgoing edges are identified for a predicted future event. In some embodiments the prediction can be more sophisticated as described below.

In one embodiment, when the predictor 732 identifies more than one predicted equivalence class for a future event, the predictor 732 is further adapted to evaluate a most likely of the predicted equivalent classes based on a statistical, semantic or content analysis of the events received in the event sequence leading to the prediction and events used in the definition of the DAG data structure 206. Thus, an event sequence in the stream of incoming events 730 that is statistically, semantically or literally more similar to events used in defining a particular path through the DAG can cause a particular path to be weighted more highly (and therefore more likely) than alternative paths. A predicted next equivalence class can then be determined as a most likely equivalence path.

Further, in some embodiments, the predictor 732 can employ event information, including attribute values, from events in an identified event sequence in the stream of incoming events that lead to a prediction. The event information can be used to generate a new predicted event by populating the predicted event attribute values based on the event information. For example, timestamp information can be predicted based on intervals between events in a current event sequence. Further, sequence extending relations 412 act as constraints on the potential values of attributes in a predicted event such that all predicted attribute values must at least satisfy criteria associated with the sequence extending relations 412. Other attribute values, or ranges or enumerations of values, may also be predicted using similar techniques.

In an embodiment, either or both of the filter 732 and predictor 734 are provided with a notifier 736a, 736b as a hardware, software or firmware component for generating a notification in response to the processing of the stream of incoming events 730. For example, where the filter 732 identifies a new event sequence not corresponding to any sequence represented by the DAG data structure 206, the notifier 736a can generate an appropriate notification. Additionally or alternatively, where the filter 732 identifies an event sequence corresponding or partially corresponding to a sequence represented by the DAG data structure 206, the notifier 736a can generate an appropriate notification. Similarly, the predictor 734 uses the notifier 736b to generate notifications of predicted equivalence classes or events.

For the avoidance of doubt, the stream of time-ordered incoming events 730 that is processed by the filter 732 and/or the predictor 734 is distinct over the plurality of events 422 used to generate the DAG data structure 206. Thus the sequence identification apparatus 200 operates with two sets of events: a first set of events 422 for the generation of the DAG data structure; and a second set of events, incoming events 730, for processing by the filter 732 and/or the predictor 734. It will be appreciated by those skilled in the art that the incoming events 730 can additionally be used to adapt, evolve, modify or supplement the DAG data structure 206 by adding a representation of identified event sequences in the stream of incoming events 730 to the DAG data structure 206 as embodiments of the present disclosure might require.

It will be appreciated by those skilled in the art that, while the filter 732 and predictor 734 are illustrated as comprised in the sequence identification apparatus 200, either of the filter 732 or predictor 734 could be omitted. Alternatively, the functions and facilities provided by the filter 732 and predictor 734 can be provided by a single unified component or components subdivided in different ways. Yet further, the functions and facilities provided by the filter 732 and/or predictor 734 can be provided by one or more components external to the sequence identification apparatus 200, such as components in communication with the apparatus 200 by hardware or software interface or over a network.

Figure 8:
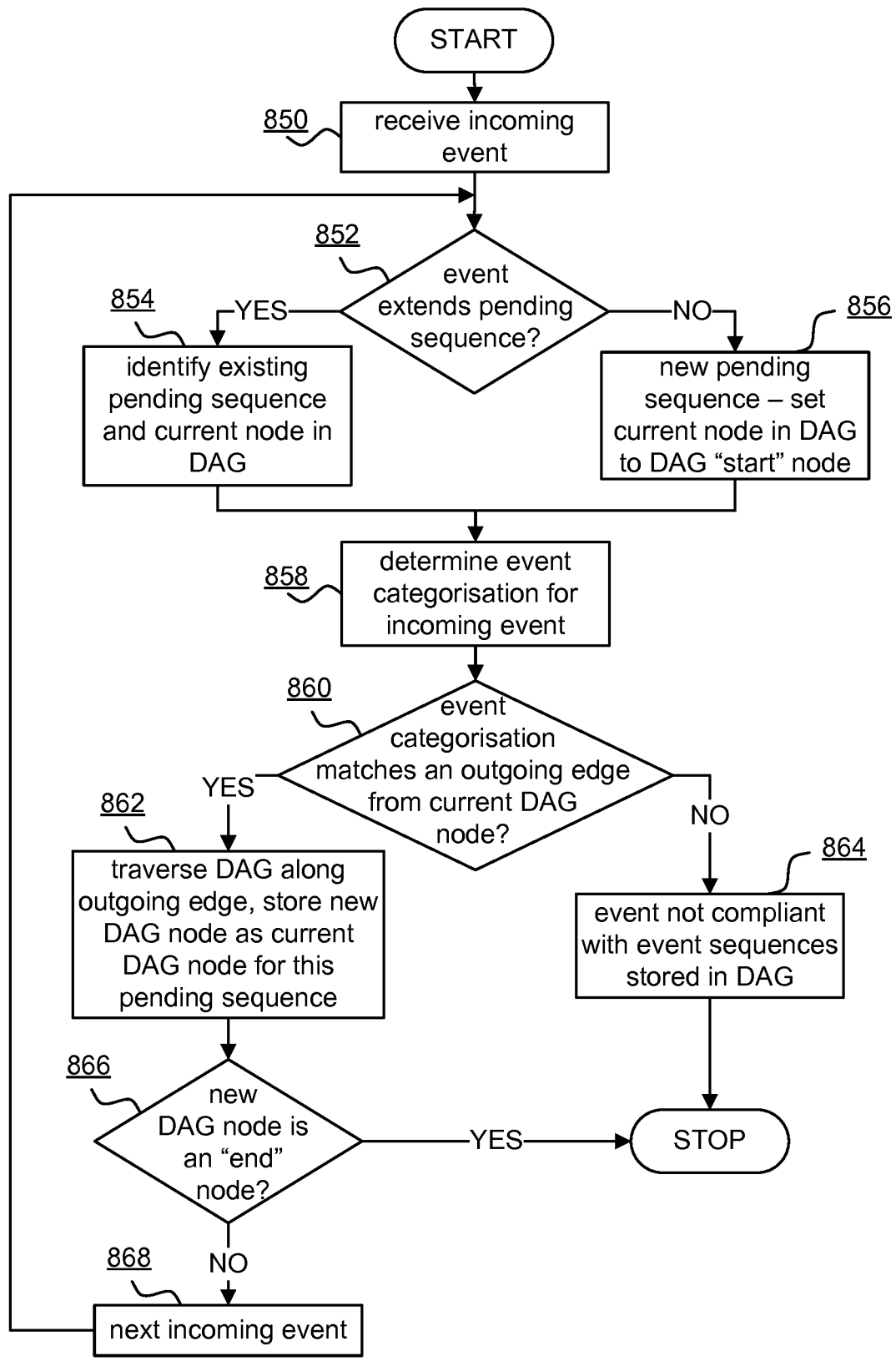
FIG. 8 is a flowchart of a method of the filter of FIG. 7 in accordance with the alternative embodiment of the present disclosure.

FIG. 8 is a flowchart of a method of the filter 732 of FIG. 7 in accordance with the alternative embodiment of the present disclosure. Initially, at 850, the filter 732 receives a new incoming event from the plurality of incoming events 730. At 852 the filter 732 determines if the received incoming event extends an event sequence the filter 732 is currently processing. The determination is based on a record of previously received events, previously identified partial event sequences, and the sequence extending relations 412. If the received event does not extend a previously received event sequence the method records the received event as the start of a potentially new event sequence at 856. In respect of the received event, the traversal of the DAG data structure 206 is initialized to the start node "S".

Alternatively, at 854, if the received event does extend a previously received partial event sequence, the method identifies the previously received partial event sequence and the current node in the DAG data structure 206 in respect of the most recent event received in the partial event sequence.

At 858 the method determines a equivalence classification for the received event. At 860 the method determines if the determined equivalence classification matches an outgoing edge from the current node in the DAG traversal. If the equivalence classification does not match an outgoing edge, at 864 the method concludes that the received event does not correspond to any of the paths in the DAG and is not compliant with any of the event sequences represented by the DAG and the method terminates.

If the equivalence classification does match an outgoing edge, at 862 the method traverses the DAG data structure 206 along the identified outgoing edge to a new current node in the DAG for the partial event sequence. If at 866 the method determines that the new current node is an end node "F", the method terminates, otherwise the method receives a next incoming event at 868 and iterates to 852.

A detailed exemplary embodiment of the present disclosure will now be described by way of example only. In the exemplary embodiment, event data is in a time-stamped tabular format (for example, as comma separated values with one or more specified fields storing date and time information) and arrives in a sequential manner, either row by row or in larger groups which can be processed row-by-row. Each column in the table has a domain $D_i$ and a corresponding attribute name $A_i$. There is a special domain O which plays the role of an identifier (e.g. row number or event id). Formally, data is represented by a function:

$$f:O \to D_1 \times D_2 \times \ldots \times D_n$$

which can be written as a relation $$R \subseteq O \times D_1 \times D_2 \times \ldots \times D_n$$

where any given identifier $o_i$ appears at most once. The notation $A_k(o_i)$ is used to denote the value of the $k^{th}$ attribute for object $o_i$.

The embodiment of the disclosure seeks to find ordered sequences of events (and subsequently, groups of similar sequences). To achieve this, sequence extending relations are defined.

In the exemplary embodiment, event sequences obey the following rules:
- each event is in at most one sequence
- events in a sequence are ordered by date and time
- an event and its successor are linked by relations between their attributes, such as equivalence, tolerance, and other relations.

These are referred to as sequence extending relations. Note that it is possible to have different sequence extending relations for different sequences. Further, it is possible to change the sequence extending relations dynamically. In the graph structure described below, the sequence extending relations are associated with nodes in the graph. In the exemplary embodiment, any event that is not part of an existing sequence is considered the start of a new sequence. For any attribute $A_i$ a tolerance relation $R_i$ can be defined where $$R_i : D_i \times D_i \to [0, 1]$$

is a reflexive and symmetric fuzzy relation and $$\forall j : R_i(A_i(O_j), A_i(O_j)) = 1$$

Then the tolerance class of objects linked through attribute $A_i$ is $$T(A_i, o_m) = \{o_j / \chi_{mj} | R_i(A_i(o_m), A_i(o_j)) = \chi_{mj}\}$$

Note that this set includes (with membership 1) all objects with the attribute value $A_i(o_m)$. The tolerance class can be expressed equivalently as a set of pairs.

Finally the case of a total order relation $P_T$ is included, defined on a distinguished attribute (or small set of attributes) representing a timestamp. Sequences and projected sequences can then be defined:

$$\forall i : P_T(A_T(o_i), A_T(o_i)) = 1$$

$$\forall i \neq j : P_T(A_T(o_i), A_T(o_j)) > 0 \to P_T(A_T(o_j), A_T(o_i)) = 0$$

$$Q(o_i) = (o_j / \chi_{ti} | P_T(o_t, o_i) = \chi_{ti})$$

where $A_T$ is the timestamp attribute (or attributes) and the ordering of events models temporal ordering. The time attribute $t_i$ obeys $t_i \leq t_{i+1}$ for all i. It is treated as a single attribute although could be stored as more than one (such as date, time of day). In the exemplary embodiment a number of sequence extending relations $R_1 \ldots R_n$ are defined on appropriate domains. Two events of and of are potentially linked in the same sequence if $$\min\left(Q_T(o_i, o_j), \min_m(R_m(o_i, o_j))\right) \geq \mu$$

i.e. all required attributes satisfy the specified sequence extending relations to a degree greater than some threshold $\mu$. Thus $$\text{potential-link}(o_i, o_j, \mu) \leftrightarrow \min\left(Q_T(o_i, o_j), \min_m(R_m(o_i, o_j))\right) \geq \mu$$

and $$\text{linked}(o_i, o_j, \mu) \leftrightarrow \text{potential-link}(o_i, o_j, \mu)$$

AND $$\nexists o_k : (\text{potential-link}(o_i, o_k, \mu) \text{ AND potential-link}(o_k, o_j, \mu))$$

i.e. two events are linked if they satisfy the specified tolerance and equivalence relations to a degree greater than some threshold □ and there is no intermediate event.

In the exemplary embodiment equivalence classes are also defined on some of the domains, used to compare and categorize events from different sequences. An equivalence class on one or more domains is represented by a value from each domain—for example, the relation "hasTheSameParity" defined on natural numbers can contains pairs such as (0, 2), (0, 4), (2, 4), (1, 5), etc. Two equivalence classes (representing the sets of even and odd numbers) can be written [0] and [1] since all elements are linked to either 0 or 1 under the relation "hasTheSameParity". Similarly, for times denoted by day and hour values, equivalence can be defined for weekday rush hour (e.g. day="Mon-Fri", hour="8,9,17,18"), other-weekday (e.g. day="Mon-Fri", hour≠"8,9,17,18") and weekend (e.g. day="Sat,Sun"). These can easily be extended to fuzzy equivalence classes. The equivalence classes partition the objects such that each object belongs to exactly one equivalence class for each domain considered. In the fuzzy case, the sum of memberships in overlapping classes is 1 and at least one membership is assumed to be 0.5 or greater. In creating the graph only the largest membership is considered. In the case of two equal memberships (e.g. 0.5) deterministic procedure is used to choose one equivalence class. Formally, for a specified attribute Ai $$S(A_i, o_m) = \{o_j | A_i(o_j) = A_i(o_m)\}$$

and the set of associated equivalence classes (also called elementary concepts) is $$C_i = \{S(A_i, o_m) | o_m \in O\}$$

(for example, time and elapsed time, as described below.)

In the propositional case $C_i$ contains just one set, whose elements are the objects for which attribute i is true. In the fuzzy case, elements are equivalent to some degree. Specifying a membership threshold gives a nested set of equivalence relations so that once a membership threshold is known the technique can proceed as in the crisp case. The operation can be extended to multiple attributes. The selected attributes are used to find the "EventCategorization". This is an ordered set of equivalence classes arising from one or more attributes (or n-tuples of attributes)

$B_k \in \{A_1, \ldots, A_n\}$

Figure 11:
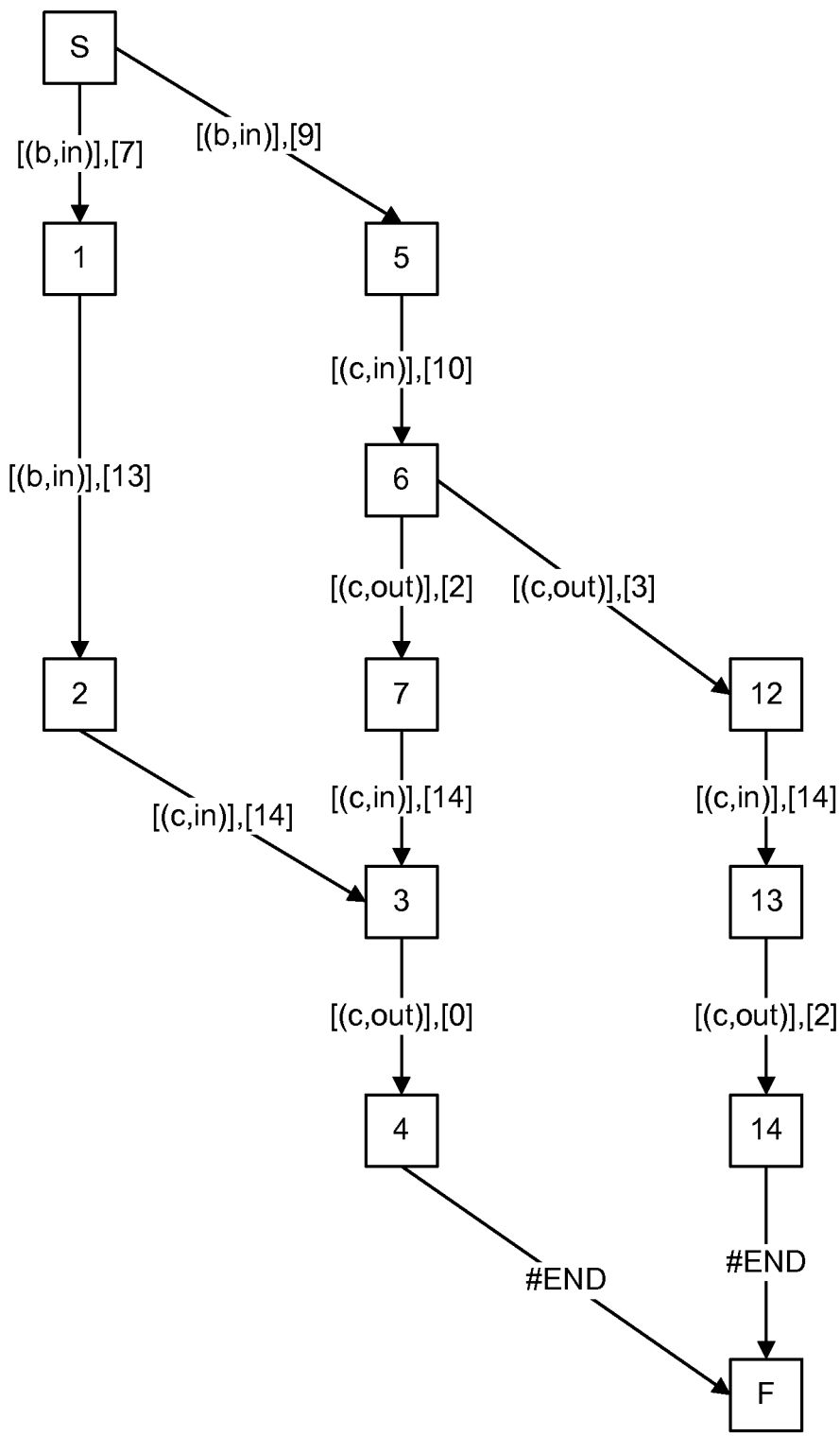
FIG. 11 is a directed acyclic graph representation of a first, second and third sequences in accordance with the exemplary embodiment of the present disclosure.

EventCategorisation$(o_i)=([B_k(o_i)|k=1, \ldots m])$ i.e. each $B_k$ is one or more of the attributes and the event categorization of some object $o_i$ is given by the equivalence classes corresponding to its attribute values. Note that the result is not dependent on the order in which the attributes are processed. This order can be optimized to give fastest performance when deciding which edge to follow from given node. For any set of sequences, a minimal representation of the sequences can be created using a DAG as illustrated in FIGS. 10 and 11. The graph is a deterministic finite automation, with no loops. Each event is represented by a labeled edge. The edge label shows the equivalence classes applicable to the event, referred to as the event categorization below. The source node "S" is a single starting point for all sequences. To ensure a unique end node "F" a dummy "end of sequence" ("#END") event is appended to all sequences.

An example of the exemplary embodiment in use will now be described based on sample data used by the IEEE "Visual Analytics Science and Technology" (VAST) challenge in 2009. The sample data simulates access by employees to badge-locked rooms via numerous entrances. In summary, events in the data set include six attributes: "eventID" as a unique event identifier; "Date"; "Time"; "Emp" or "Employee" as a unique employee identifier as either "10", "11" or "12"; "Entrance" as a unique identifier of a security entrance as either "b", corresponding to access to a building, or "c" corresponding to access to a classified section of the building; and "Direction" as an access direction as either "in" or "out".

Table 1 below provides the sample data set. Note that the data has been ordered by employee for ease of reading to identify event sequences, though in use the events would be time-ordered.

TABLE 1

| eventID | Date | Time | Employee | Entrance | Direction |
|---|---|---|---|---|---|
| 1 | jan-2 | 7:30 | 10 | b | in |
| 2 | jan-2 | 13:30 | 10 | b | in |
| 3 | jan-2 | 14:10 | 10 | c | in |
| 4 | jan-2 | 14:40 | 10 | c | out |
| 5 | jan-2 | 9:30 | 11 | b | in |
| 6 | jan-2 | 10:20 | 11 | c | in |
| 7 | jan-2 | 13:20 | 11 | c | out |
| 8 | jan-2 | 14:10 | 11 | c | in |
| 9 | jan-2 | 15:00 | 11 | c | out |
| 10 | jan-3 | 9:20 | 10 | b | in |
| 11 | jan-3 | 10:40 | 10 | c | in |
| 12 | jan-3 | 14:00 | 10 | c | out |
| 13 | jan-3 | 14:40 | 10 | c | in |
| 14 | jan-3 | 16:50 | 10 | c | out |
| 15 | jan-3 | 9:00 | 12 | b | in |
| 16 | jan-3 | 10:20 | 12 | c | in |
| 17 | jan-3 | 13:00 | 12 | c | out |
| 18 | jan-3 | 14:30 | 12 | c | in |
| 19 | jan-3 | 15:10 | 12 | c | out |

First a set of sequence extending relations is defined as a set of equality and permitted transition relations to detect candidate sequences. For a candidate sequence of n events:

$S_i=(o_{i1}, o_{i2}, o_{i3}, \ldots, o_{in})$ the following computed quantities are defined ElapsedTime $\Delta T_{i,j}=\text{Time}(o_{ij})-\text{Time}(o_{ij-1})$ with $\Delta T_{i1}=\text{Time}(o_{i1})$ and restrictions (for j>1)

Date$(o_{ij})$=Date$(o_{ij-1})$ $0<\text{Time}(o_{ij})-\text{Time}(o_{ij-1}) \leq T_{thresh}$ Emp$(o_{ij})$=Emp$(o_{ij-1})$ (Action$(o_{ij-1})$, Action$(o_{ij})$)$\in$AllowedActions where Action$(o_{ij})$=(Entrance$(o_{ij})$, Direction$(o_{ij})$)

where the relation "AllowedActions" is given by the table in FIG. 9. In the table of FIG. 9 the first action is indicated by a row and a following action is indicated by a column.

These constraints can be summarized as events in a single sequence refer to the same employee; and successive events in a single sequence conform to allowed transitions between locations and are on the same day, within a specified time of each other.

A suitable time threshold is chosen, such as $T_{thresh}=8$. This ensures anything more than 8 hours after the last event is a new sequence. Candidate sequences are identified by applying the sequence extending relations. Any sequence has either been seen before or is a new sequence. From the sample data, candidate sequences are made up of the events:

1-2-3-4
5-6-7-8-9
10-11-12-13-14
15-16-17-18-19

The equivalence class "EventCategorization" is also defined for comparing events in different sequences:

EquivalentAction=$I_{Action}$

For Direction In, EquivalentEventTime={[7],[8], . . . }

For Direction Out, EquivalentElapsedTime={[0],[1], [2], . . . } where I is the identity relation and the notation [7] represents the set of all start times from 7:00-7:59, etc. With this definition events 5 and 10 are regarded as equivalent since they both have Entrance="b", Direction="In" and Time in "7:00-7:59". Formally, EventCategorisation$(o_5)=([b,in],[7])$ EventCategorisation$(o_{10})=([b,in],[7])$ Similarly, events 7 and 12 are equivalent, as both have Entrance="c", Direction="Out" and ElapsedTime in "3:00-3:59". Each identified sequence is represented as a graph labeled by its event categorizations and combine multiple sequences into a minimal DAG representing the categorized version of all sequences seen so far, as illustrated in FIGS. 10 and 11.

Assuming that nodes are denoted by unique numbering, since the graph is deterministic each outgoing edge is unique. An edge can therefore be specified by its start node and its partial event categorization. It is also acceptable to refer to an edge by its partial event categorization label if there is no ambiguity about its start node. Standard definitions are used for "InDegree", "OutDegree", "IncomingEdges" and "OutgoingEdges" of a node, giving respectively the number of incoming edges, the number of outgoing edges, the set of incoming edges and the set of outgoing edges. Functions "Start" and "End" can also be applied to an edge in order to find or set start and end nodes respectively. Further, a function "EdgeCategorization" can be used to find a categorization class for an edge. Further, the function "ExistsSimilarEdge(edge, endnode)" can be defined to return "true" when:
- "edge" has end node "endnode", event categorization "L" and start node "S1";
- a second, distinct, edge has the same end node and event categorization "L" but a different start node "S2"; and
- "S1" and "S2" have the same incoming edges: IncomingEdges(S1)=IncomingEdges(S2).

If such an edge exists, its start node is returned by the function "StartOfSimilarEdge(edge, endnode)". The function "CreateNewNode(Incoming, Outgoing)" creates a new node with the specified sets of incoming and outgoing edges.

The DAG can be used to identify sequences of events that have already been seen. If a new sequence is observed (i.e. a sequence which differs from each sequence in the graph by at least one event categorization) then it can be added to the graph using an algorithm such as is provided below. Note that the algorithm assumes a graph G=(V, E) such that new nodes are added to the set V and edges are added to/deleted from the set E. The algorithm proceeds in three distinct stages. In the first and second parts, the algorithm moves step-by-step through a new event sequence and a DAG, beginning at a start node "S". If an event categorization matches an outgoing edge, the algorithm follows that edge to a next node and moves on to the next event in the event sequence. If the new node has more than one incoming edge, the algorithm copies it; the copy takes the incoming edge that was just followed, and the original node retains all other incoming edges. Both copies have the same set of output edges. This part of the algorithm finds other sequences with one or more common starting events.

If at some point, a node is reached where there is no outgoing edge matching a next event's categorization. New edges and nodes for the remainder of the sequence are created, eventually connecting to the end node "F". Note that as the sequence is new, the algorithm must reach a point at which no outgoing edge matches the next event's categorization; if this happens at the start node "S" then the first stage is effectively missed.

Figure 12:
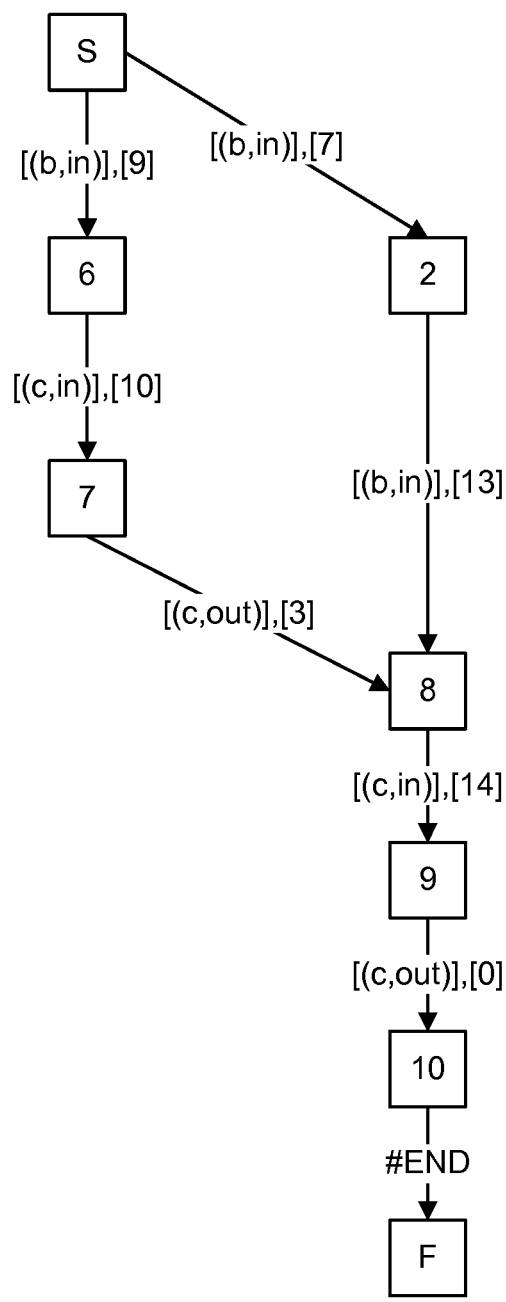
FIG. 12 is a directed acyclic graph representation of a first and second sequences generated in accordance with an exemplary algorithm in an embodiment of the present disclosure.
Figure 13:
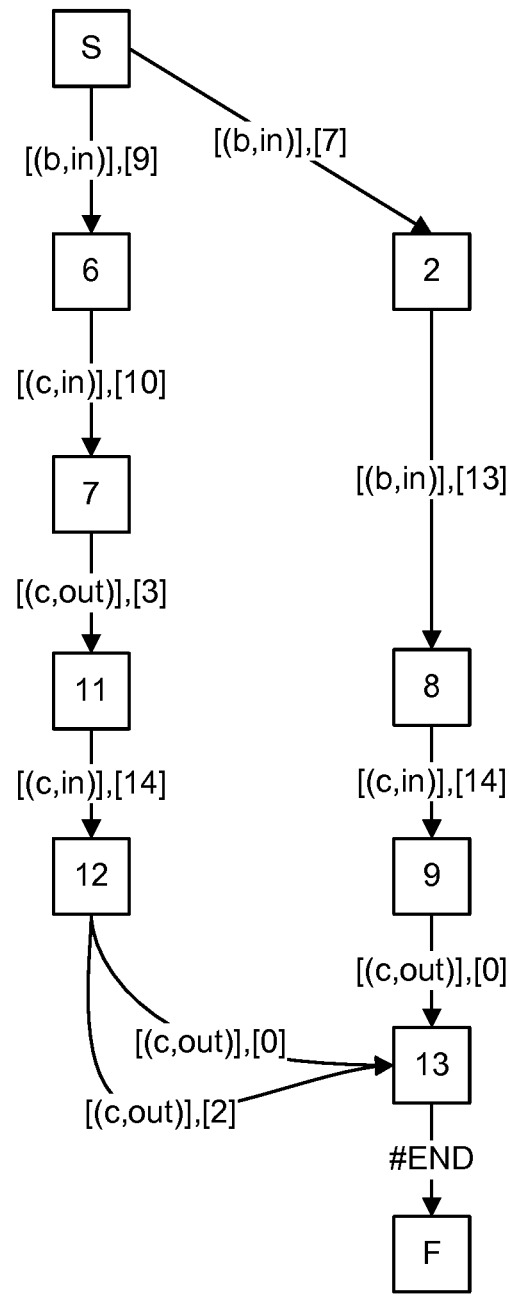
FIG. 13 is a directed acyclic graph representation of a first, second and third sequences generated in accordance with an exemplary algorithm in an embodiment of the present disclosure.
Figure 14:
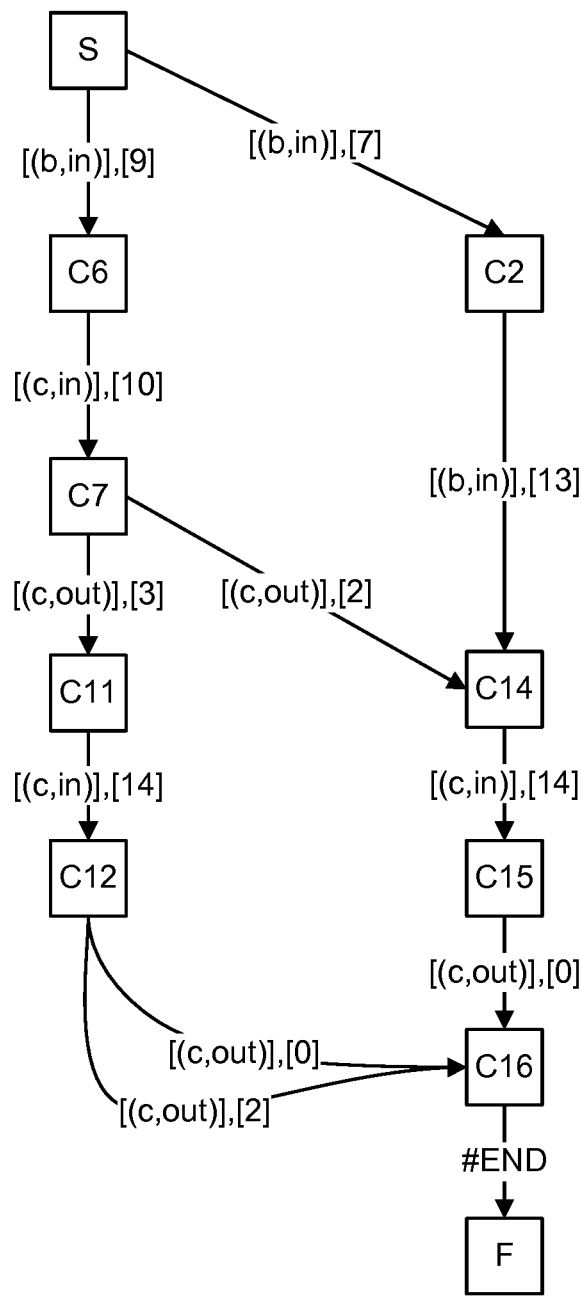
FIG. 14 is a directed acyclic graph representation of a first, second, third and fourth sequences generated in accordance with an exemplary algorithm in an embodiment of the present disclosure.

Finally, in the third stage, the algorithm searches for sequences with one or more common ending events. Where possible, the paths are merged. FIGS. 12, 13 and 14 illustrate the development of the DAG after the first two sequences, then after addition of the third and finally after addition of the fourth sequence.

Algorithm ExtendGraph
Input: Graph G with start node S, end node F, representing the current DAWG (minimal)
  CandidateSequence Q[0-NQ] representing the candidate sequence; each element is an event identifier. The sequence is terminated by #END NB the sequence is not already present in the graph.

Output: updated minimal graph, incorporating the new sequence
Local variables: Node startNode, newNode, endNode, matchingNode
        Edge currentEdge, matchingEdge
        Categorisation currentCategorisation
        integer seqCounter;
startNode = S
seqCounter = 0
WHILE EventCategorisation(S[seqCounter]) ∈ OutgoingEdges(StartNode)
    currentEdge = (startNode, EventCategorisation(Q[seqCounter] )
    endNode = End (currentEdge)
    IF InDegree (endNode) > 1
    THEN
        newNode = CreateNewNode({currentEdge}, -continued

```
        OutgoingEdges(endNode))
        IncomingEdges(endNode) = IncomingEdges (endNode) –
        currentEdge
        startNode = newNode
    ELSE
        startNode = endNode
    seqCounter++
ENDWHILE
WHILE seqCounter < NQ                       // create new path
    currentEdge = (startNode, EventCategorisation (S[seqCounter]) )
    startNode = CreateNewNode({currentEdge}, { })
    seqCounter++
ENDWHILE
currentCategorisation = #END
currentEdge = (startNode, #END )     // last edge, labelled by #END
IncomingEdges(F) = IncomingEdges (F) + currentEdge
endNode = F
WHILE nextEdgeSet contains exactly one element (i.e currentEdge)
              AND ExistsSimilarEdge(currentEdge, endnode)
    matchingNode = StartOfSimilarEdge(currentEdge, endnode)
    startNode = Start (currentEdge)
    IncomingEdges(endNode) = IncomingEdges (endNode) –
    {currentEdge}
    nextEdgeSet = IncomingEdges (startNode)
    IncomingEdges (matchingNode) = nextEdgeSet ∪ IncomingEdges
    (matchingNode)
    endNode = matchingNode
    currentEdge ∈ edgeSet //choose any element,"while" loop terminates
    if>1
END WHILE
```

Algorithm ReduceGraph
Input: Graph G, start node S, end node F, the current DAWG (minimal)
  Sequence C[0-NQ] representing the sequence of event categories to be removed. Each element is an event categorization. The sequence is terminated by #END NB the sequence must be present in the graph and there must be at least one sequence in the graph after removal.

Output: updated minimal graph, excluding the removed sequence
Local variables: Node startNode, endNode
        Edge currentEdge, matchingEdge
        Categorisation currentCategorisation
        integer seqCounter;
startNode = S
seqCounter = 0
currentEdge = (startNode, C[0])
endNode = End(currentEdge)
WHILE endNode ≠ F
    WHILE OutDegree(startNode) > 1
            AND InDegree(endNode) == 1
            AND OutDegree(endNode) == 1
        currentEdge = (endNode, C[seqCounter])
        seqCounter++
    END WHILE
    IF (InDegree(endNode) > 1)
        delete path from startNode to endNode
    startNode = endNode
    currentEdge = (startNode, C[seqCounter])
    endNode = End(currentEdge)
    seqCounter++
END WHILE When analyzing access records, travel logs and other data relevant to physical security such as building security, it is generally necessary to simplify the data by finding groups of similar entities. For example these may include employees with similar movements, buildings with similar access patterns, days of the week or times of the day when similar events or sequences of events occur, etc. Notably similar considerations apply when dealing with logical or virtual entities such as networked computer systems, terminals, cellular telephones, smartphones, software processes, applications and the like, software agents, etc.

Identifying such groups can be seen as form of clustering—a popular approach to classifying and structuring data in which groups of objects are identified that have some common properties. However, there is considerable flexibility in choosing what constitutes "common" properties, with a system designer able to choose different attributes for a comparison and different ways to measure similarity between attribute values. Often attributes having numerical values and an underlying scale of measurement are chosen to calculate similarity since comparison is relatively straightforward in either a binary (yes/no) or a graded fashion. Other attributes (either those taking values from a set of discrete (symbolic) quantities, or those where there is no underlying measurement scale) are generally included when strict equality is the only important relation. Clustering is very much more difficult when sequences of events are considered, compared to just focusing on single events. For example, if there are two accesses to a building timed at 9:00 and 9:02 then the times might be viewed as identical; similarly, if an employee enters one building at 12:00 and a different building at 2:00, whilst a second employee enters the same buildings at 12:05 and 1:55 respectively, then the sequences might be viewed as identical. The underlying scale allows us to compare the differences in absolute times (single events) or elapsed times (event sequences). In this example the differences are a small number of minutes and a designer or administrator could implement methods to judge whether the differences are sufficiently small to be ignored or to indicate a graded degree of similarity. On the other hand, if employees numbered 900 and 902 enter a building (or, similarly, if access card machines are denoted by 1200 and 1205) there is no reason to consider events similar in any way—strict equality is the only indication that events should be grouped together (indicating identical employees or access card machines, for example).

In many cases there are meaningful similarities between attribute values which do not have an underlying numerical ordering such as the IDs of employees in equivalent or closely-related roles, buildings which are used for similar purposes, etc. These similarities may be based on background knowledge or on their co-occurrence in event sequences. If known, the similarity between these values could be used to improve the grouping of event sequences and to identify further relations such as associations among groups of entities. In general a similarity between unordered attribute values has to be explicitly specified by means of a relation (such as a table giving a numerical similarity for each pair of values). Producing such a table can be time consuming and error-prone and may lead to inconsistencies particularly when graded similarities are considered.

In some embodiments of the present disclosure event sequence data can be used to produce graded relations which indicate groups of attribute values that can be considered equivalent, as well as groups which can be treated as linked but not equivalent. The approach allows analyst insight to augment the relations.

Clustering is a standard technique in data analysis, data mining and machine learning. Standard introductory texts such as "Computational Intelligence—A Methodological Introduction" (Rudolf Kruse et al., Springer ISBN 978-1-4471-5012-1), "Introduction to Information Retrieval" (C D. Manning et al, Cambridge University Press ISBN 978-0-521-86571-5) exist in these areas describing some common approaches. In general these approaches rely on data being in the form of a table of numerical values with an underlying ordering so that distance can be measured between data points. Each row corresponds to an object (data point) and each column to an attribute. Where data is not in the required numerical form it is typically converted—for instance, a standard approach to document analysis is to count frequencies of words, treat the list of frequencies as a large-dimensional vector and measure the distance between documents by comparing the vectors. Implicitly this means that the presence of identical words (or, more generally, phrases) in two documents increases the similarity of the documents. In many cases, the requirement for identity of values is overly restrictive. This is also apparent in the application of formal concept analysis, which is another standard data analysis technique used to group objects into related sets on the basis of their attribute values. Formal Concept Analysis (FCA) is a method of extracting structure from datasets in object-attribute-value format. See: "Formal Concept Analysis: Methods and Applications in Computer Science" (Bernhard Ganter and Gerd Stumme, 2003); and "Finger Exercises in Formal Concept Analysis" (Berhard Ganter, T U Dresden, 2006, available at "www.math.tu-dresden.de/~ganter/psfiles/FingerExercises.pdf").

Formal concept hierarchies can be complex due to a large numbers of concept which may differ only slightly in extension. A significant problem arises where attributes are not simple binary quantities—for example, an attribute such as colour taking n possible values {blue, lightBlue, darkBlue, red, lightRed, . . . } has to be replaced by n individual attributes with "true"/"false" values, such as colour=red, colour=blue, etc. Similarly, numerical attributes must be "scaled" by choosing a set of non-overlapping intervals and replacing the single numerical-valued attribute by a set of binary attributes indicating whether the values is contained in each interval.

Fuzzy set theory has been proposed as an alternative to numerical scaling. Fuzzy set theory is a well-established approach to modeling uncertainty, with numerous successful applications. Its main advantage is the ability to handle definitions of terms and sets without having to give strict yes/no boundaries—for example, the notion of a tall person does not need to be given a strict boundary above which a person is considered tall, and below which the person is considered as not tall.

Fuzzy formal concept analysis (FCA) is an approach to forming meaningful groups of data represented as one or more fuzzy relations. Fuzzy FCA makes use of all available data and leads to a lattice-based hierarchy of categories. As with standard FCA it is a useful tool in cases where there is a relatively small amount of data and can indicate significant associations and relations within the data. In relatively small examples, such information is readily apparent, but in the case of a much larger table (in number of rows, columns or both) the diagram may offer a better virtualization.

Unfortunately fuzzy FCA suffers from at least two disadvantages in this respect. Firstly, small differences in membership values (particularly smaller values) can result in the generation of large numbers of nodes in a lattice (concepts) which do not clarify a virtualization. Related to this, the computational resources required to calculate a fuzzy concept lattice can increase significantly as a table size increases leading to scalability challenges as larger datasets are considered.

Figure 15:
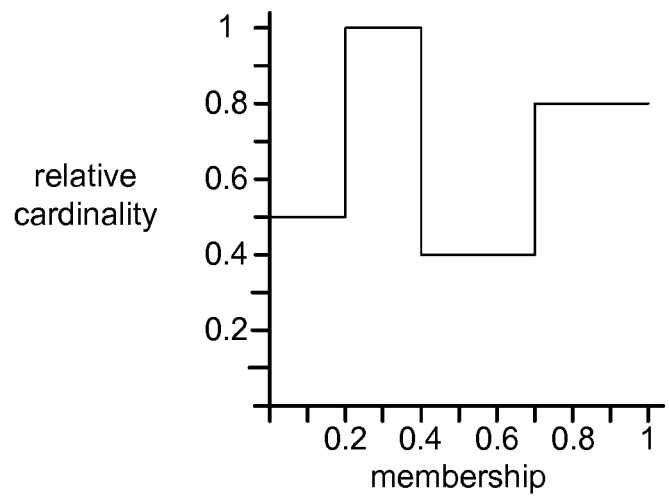
FIG. 15 is an illustrative example of an x-mu number.

A consequence of the fuzzy FCA approach is loss of the "law of the excluded middle"—essentially, where human intuition (and possibly also standard logic) dictates that a proposition must be true or false, standard fuzzy theory allows the proposition to be partly true and partly false. This problem can be avoided by employing the x-mu representation of fuzzy sets as described in "The X-mu Approach: Fuzzy Quantities, Fuzzy Arithmetic and Fuzzy Association Rules" (Trevor Martin and Ben Azvine, IEEE, 2013) and "The X-mu Representation of Fuzzy Sets—Regaining the Excluded Middle" (Trevor Martin and Ben Azvine, IEEE, 2013). The x-mu approach addresses this challenge by using a crisp cut-off point between membership and non-membership of a set while allowing this crisp cut-off point to vary. Thus all properties of crisp methods are retained. For the purposes of the present specification an x-mu number is represented as a series of linear segments giving the value of the number at a specified membership level m where $0 < m \leq 1$. FIG. 15 is an illustrative example of an x-mu number. The x-mu number represented by FIG. 15 is:

0.5 in the range $0 < m \leq 0.2$
1.0 in the range $0.2 < m \leq 0.4$
0.4 in the range $0.4 < m \leq 0.7$
0.8 in the range $0.7 < m \leq 1.0$ This can be represented conveniently by a set of membership and value pairs. In cases where there are a large number of such pairs, memberships can be restricted to a fixed set of points (for example, 0.2, 0.4, 0.6, 0.8. 1.0).

Arithmetic operations can be performed as described in "The X-mu Representation of Fuzzy Sets—Regaining the Excluded Middle" (Trevor Martin and Ben Azvine, IEEE, 2013). In general x-mu numbers are represented by analytic functions mapping membership to value but for the purposes of describing exemplary embodiments of the present disclosure the flat linear segments described above are sufficient.

Considering, for example, the domain of physical security such as building access control and the like, types or categories of journey made by employees can be extracted from access records using methods described above with respect to FIGS. 2 to 14 whereby a DAG is generated based on sequence extending relations and equivalence classes, each path through such a graph constituting a category or journey type. For example, the minimal DAG of FIG. 11 shows three discrete paths: {S, 1, 2, 3, 4, F}; {S, 5, 6, 7, 3, F}; and {S, 5, 6, 12, 13, 14, F}. Each such path corresponds to a different type or category of journey for entities (employees) for which events were used to generate the DAG. Accordingly each entity has an association with each category based on a frequency of association with each category (i.e. an occurrence of events along a sequence of event classes of the DAG for the entity). Such frequencies can be used to define degrees of membership of each entity with each category and fuzzy relations between entities and categories, such as by normalizing the frequencies to a maximum frequency for an entity. However, it is not known from such a DAG how entities can themselves be grouped together as entities with similar behaviors (or having similar journeys) according to events received for such entities.

Consider, for example, a small set of employees, access records and journey types as shown in Tables 2 and 3 below. From the limited data of Table 2 we can see patterns such as buildings 21 and 23 having similar access patterns, employees a and b having similar start times, etc.

TABLE 2

| Employee ID | Access Card Number | Date/Time | Building ID | Entrance ID | Direction (in or out) | Result |
|---|---|---|---|---|---|---|
| a | 123 | 01-10-2013 09:00 | 21 | 4 | in | granted |
| b | 456 | 01-10-2013 09:10 | 23 | 3 | in | granted |
| b | 456 | 02-10-2013 08:50 | 21 | 4 | in | granted |
| a | 123 | 02-10-2013 09:20 | 23 | 7 | in | granted |
| etc. | | | | | | |

An expanded table of the data of Table 2 might lead to the identification of four types, or categories (e1 to e4), of sequence, using the analysis described above with respect to FIGS. 2 to 14 with each category corresponding to a path through a directed acyclic graph data structure.

TABLE 3

| | access and travel pattern | | | |
|---|---|---|---|---|
| employee-id | access to one building, 8-10 am (e1) | access to one building, outside 8-10 (e2) | access to multiple buildings in same day (e3) | access to multiple buildings, large distance apart same day (e4) |
| a | 0.7 | 0.8 | 1 | 0.6 |
| b | 0.7 | 1 | 0 | 0 |
| c | 1 | 0 | 0.8 | 0 |
| d | 0.9 | 0 | 1 | 0 |
| e | 1 | 0 | 1 | 0 |
| f | 0.2 | 1 | 0 | 0 |
| g | 0.6 | 0 | 1 | 1 |
| h | 0 | 1 | 0.9 | 0.3 |
| i | 0 | 1 | 1 | 0.3 |

Table 3 shows the degree to which each employee (a, b, c, . . . , i) conforms to different travel categories over a specified period of time (the categories are: entering a single building between hours of 8:00 and 10:00; entering one building outside these hours; entering multiple buildings during a single working day; and entering multiple and widely separated buildings during one working day). The values in Table 3 indicate whether a significant proportion of the employee's pattern of travel and access to buildings matches the category, and thus can be derived from frequencies of the event data.

Figure 16:
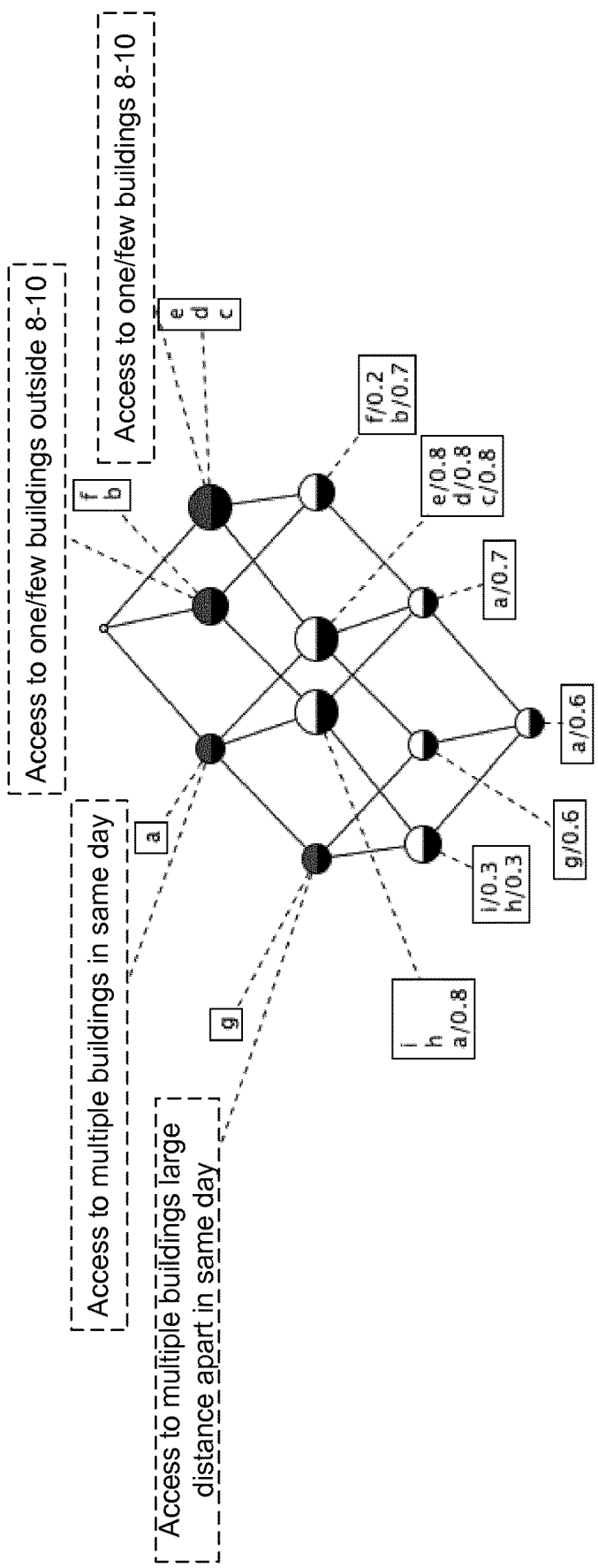
FIG. 16 illustrates an exemplary fuzzy formal concept analysis lattice for the data of Table 3.

Table 3 defines a fuzzy relation as a form of data that can be converted to a standard Boolean table by application of an arbitrary cut-off between belonging/not belonging to a category. As mentioned above, it can be analyzed and virtualized by means of fuzzy formal concept analysis leading to a lattice. FIG. 16 illustrates an exemplary fuzzy formal concept analysis lattice for the data of table 3. In the lattice of FIG. 16 reduced fuzzy labeling is used so that attributes (labeled within broken-line boxes) apply to the attached concept and all descendant concepts; objects (labeled within unbroken-line boxes) are members of the attached concept plus all ancestor concepts. Where an element is included in a concept with multiple membership, the maximum is taken.

For example, in this example the fuzzy concept lattice shows that few people (in fact, only employee a) have strong membership in all categories, and that the categories have dependencies. For example, "access to multiple buildings a large distance apart" implies "access to multiple buildings" (but not vice-versa). However, it can be difficult to interpret the diagram and it is often difficult to identify the significant groupings of entities.

Accordingly embodiments of the present disclosure provide for the identification of clusters of entities (such as clusters of employees, buildings, times of day and the like). Such clusters can form the basis of further analysis such as mining for associations, looking for full dependency between clusters, etc. In the wider context, embodiments of the present disclosure provide a robust and scalable way to form overlapping clusters from fuzzy data with a single, easy-to-understand parameter used to control the degree of closeness required to merge elements into the same cluster.

In one embodiment event data is initially provided in a table, list, linked-list, relational structure, database or other suitable data structure or data storage mechanism giving a unique identifier for each event and values for the attributes of interest. In the case of physical security logs such attributes could include date/time, location data, employee identification data (such as card-id), access control outcome or result (such as access granted/refused), etc. Additionally events are organized into sequences of related events (such as for each employee and each day, the set of event sequences involving the specified employee on the specified day).

In summary the method proceeds as follows:
1. Select the attribute of interest—for illustration, Table 2 is used (and corresponding Table 3) as an example and employee-id is selected as the attribute of interest. The possible values of this attribute (a, b, . . . i) form the entity set which is to be grouped by tolerance relations.
2. Create a minimal directed acyclic graph representing the sequences (as described in above with respect to FIGS. 1 to 14). In one embodiment, the edges of the graph are labeled with sets of events (and hence sets of entities involved in those events).
3. Define a graded boundary governing a threshold at which two entities are considered identical. This is an xmu (fuzzy) number which allows the threshold to vary at different membership levels (described below with respect to FIG. 19.
4. Construct a (fuzzy) relation between the entity set (the possible values of the attribute selected in step 1—i.e. employee-id in this example) and the paths through the graph of step 2, each path constituting a category of behavior of entities. The membership in the fuzzy relation indicates a degree to which each entity belongs to a category or a degree of association of the entity with the category. One technique for identifying these memberships is to normalize entity frequencies for each category (path through the DAG) to a maximum frequency (for the entity). Alternatively any method giving a fuzzy membership is suitable.
5. For each entity, the fuzzy relation is compared to an existing cluster of entities using xmu Jaccard similarity coefficients described below. If the similarity of the entity's relation to one or more members of an existing cluster is above the threshold (defined in step 3) then the entity is added to the cluster. If it is within the threshold of more than one cluster, such multiple clusters can be merged. If it is not within the threshold of any existing cluster, the entity forms a new cluster. Initially a set of clusters is empty.
6. Once all entities have been considered the clusters serve to partition the entities. The edges of the DAG (labeled with entities) can be re-labeled with the clusters of entities.

The process can be repeated for other attributes of interest—such as building-ids, day of the week, etc. Additional analysis can be performed on the clusters of entities, such as determining associations between clusters from different attributes (such as related employees and related buildings). Once all attributes of interest have been partitioned in this way the re-labeled DAG is a representation of previously seen behavior for the identified clusters. Assuming the threshold (at step 3) is chosen at a level that leads to a relatively small number of clusters, an analyst can examine the normal behaviors of each cluster and, if necessary, add further possible categories of behavior. Additional sequence data can be rapidly compared to the re-labeled graph and any sequences that do not fit the established pattern can be flagged for further attention (i.e. any sequence that would lead to either a new path added to the graph, or a new label added to a path).

Figure 17:
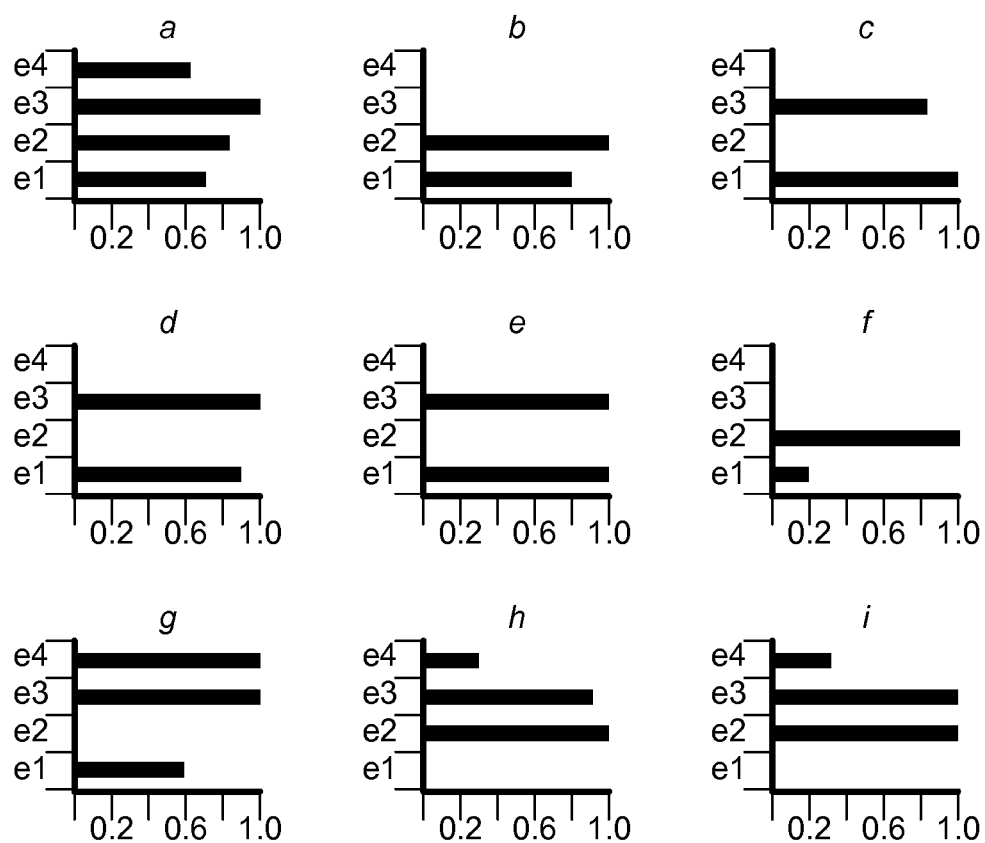
FIG. 17 illustrates a set of (fuzzy) relations between each entity in the entity set (employee id's a to i) and categories of behavior (e1 to e4) of the entities defined in Table 3 in accordance with an embodiment of the present disclosure.

FIG. 17 illustrates a set of (fuzzy) relations between each entity in the entity set (employee id's a to i) and categories of behavior (e1 to e4) of the entities defined in Table 3 in accordance with an embodiment of the present disclosure. Each relation is a fuzzy relation because it is defined in terms of a variable degree of membership on a normalized scale of zero to one for each category of behavior (per Table 3). The membership in the fuzzy relation indicate a degree to which each entity belongs to each category.

The pseudo code below labeled "similarity_calculation" provides an exemplary method for comparing two entities by evaluating a Jaccard similarity coefficient for the entities based on the entity relations of FIG. 17. Thus, in this way a degree of similarity can be ascertained as a Jaccard coefficient represented as an xmu number. In the following the notation e/m is used to denote a "category/membership" pair in a relation of FIG. 17. Thus e1/0.5 denotes a relationship with category e1 with membership degree 0.5. Further, the notation I/m is used to denote an x-mu fuzzy number with value 1 up to membership m and zero after. The pseudo code accepts as input sets S1 and S2 as discrete relations with categories sorted by some defined ordering common to the sets (e.g. lexical or numerical ordering, such as an order e1, e2, e3, e4 or the like). For example, the relation for entity a depicted in FIG. 17 can be: {e1/0.7, e2/0.8, e3/1, e4/0.6}. Where an entity has no membership with a category, such category is omitted in the relation. Thus, the relation for entity b depicted in FIG. 17 can be: {e1/0.7, e2/1}. The pseudo code assumes a procedure exists to find a next category/membership pair in a relation, and that this procedure returns "invalid_category" when it reaches the end of the list of category/membership pairs in a relation. The pseudo code generates as output an xmu number representing a Jaccard coefficient of similarity of the input relations, the coefficient varying with membership.

| | Pseudo code: similarity_calculation |
|---|---|
| 1 | Initialize two empty x-mu numbers: xmuIntersectionCardinality; and xmuUnionCardinality. |
| 2 | Initialize E1/m1 to the first category/membership pair in set S1, and E2/m2 to the first category/membership pair in set S2 |
| 3 | While E1 and E2 are both valid categories |
| 3.1 | If E1<E2 (according to a fixed order) |
| 3.2 | Then |
| 3.2.1 | add (1/m1) to xmuUnionCardinality |
| 3.2.2 | set E1/m1 to next category/membership pair in S1 |
| 3.3 | Else if E2 < E1 (according to the fixed order) |
| 3.4 | Then |
| 3.4.1 | add (1/m2) to xmuUnionCardinality |
| 3.4.2 | set E2/m2 to next category/membership pair in S2 |
| 3.5 | Else |
| 3.5.1 | add (1/MAX(m1,m2)) to xmuUnionCardinality |
| 3.5.2 | add (1/MIN(m1,m2)) to xmuIntersectionCardinality |
| 3.5.3 | set E1/m1 to next category/membership pair in S1 |
| 3.5.4 | set E2/m2 to next category/membership pair in S2 |
| 4 | End While |
| 5 | If S1 or S2 contains further categories (note that at least one is now empty) |
| 6 | Then |
| 6.1 | Initialize E/m to E1/m1 or E2/m2 (whichever is valid) |
| 6.2 | While E is a valid category |
| 6.2.1 | add (1/m) to xmuUnionCardinality |
| 6.2.2 | set E/m to next category/membership pair |
| 6.3 | End While |
| 7 | Return xmuIntersectionCardinality/xmuUnionCardinality (Jaccard coefficient) |

The similarity_calculation pseudo code will now be demonstrated in-use for the input relations for entity a and entity b as follows:

$S1=\{e1/0.7, e2/0.8, e3/1, e4/0.6\}$ (i.e. entity a)

$S2=\{e1/0.7, e2/1\}$ (i.e. entity b)

The similarity_calculation pseudo code is depicted a step at a time for the input S1, S2. The state of the xmuUnionCardinality and xmuIntersectCardinality values (as xmu numbers) are depicted in FIGS. 18*a* to 18*d* as indicated below. Finally the evaluated Jaccard coefficient of similarity is depicted in FIG. 18*e* as the quotient of xmuIntersectCardinality/xmuUnionCardinality (also an xmu number).

| STEP | STATE |
|---|---|
| 2 | E1/m1←e1/0.7; E2/m2←e1/0.7 |
| 3 | True (E1 and E2 relate to valid categories e1 and e1) |
| 3.1 | False (e1 is not < e1) |
| 3.3 | False (e1 is not < e1) |
| 3.5.1 | xmuUnionCardinality←xmuUnionCardinality + 1/MAX(0.7,0.7) (Fig. 18a) |
| 3.5.2 | xmuIntersectCardinality←xmuIntersectCardinality + 1/MIN(0.7,0.7) (Fig. 18a) |
| 3.5.3 | E1/m1←e2/08; E2/m2←e2/1 |
| 4 | LOOP |
| 3 | True (E1 and E2 relate to valid categories e2 and e2) |
| 3.1 | False (e2 is not < e2) |
| 3.3 | False (e2 is not < e2) |
| 3.5.1 | xmuUnionCardinality←xmuUnionCardinality + 1/MAX(0.8,1) (Fig. 18b) |
| 3.5.2 | xmuIntersectCardinality←xmuIntersectCardinality + 1/MIN(0.8,1) (Fig. 18b) |
| 3.5.3 | E1/m1←e3/1; E2/m2←invalid_category |
| 4 | LOOP |
| 3 | False (E2 relates to invalid_category) |
| 5 | True (S1 contains valid categories) |
| 6.1 | E/m←e3/1 (current valid category from S1) |
| 6.2 | True (E relates to valid category e3) |
| 6.2.1 | xmuUnionCardinality←xmuUnionCardinality + 1/1 (Fig. 18c) |
| 6.2.2 | E/m←e4/0.6 |
| 6.3 | LOOP |
| 6.2 | True (E relates to valid category e4) |
| 6.2.1 | xmuUnionCardinality←xmuUnionCardinality + 1/0.6 (Fig. 18d) |
| 6.2.2 | E/m←invalid_category |
| 6.3 | LOOP |
| 6.2 | False (E relates to invalid_category) |
| 8 | Jaccard_coefficient←xmuIntersectCardinality / xmuUnionCardinality (Fig. 18e) |

Figure 18A:
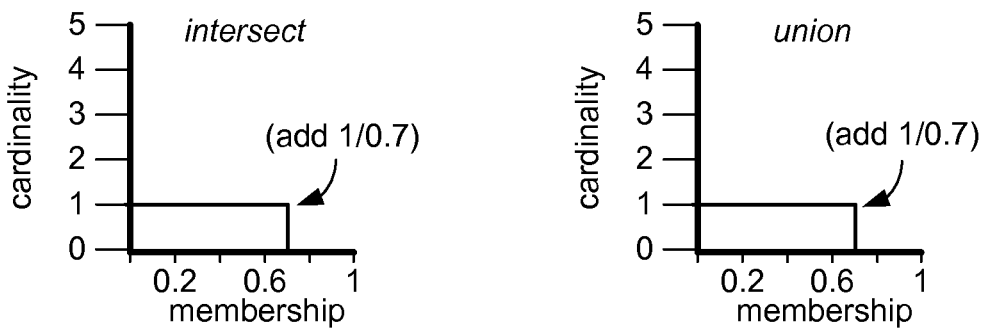
FIGS. 18a to 18e illustrate xmu values for union cardinality and intersect cardinality and a xmu Jaccard similarity coefficient in accordance with an embodiment of the present disclosure.
Figure 18B:
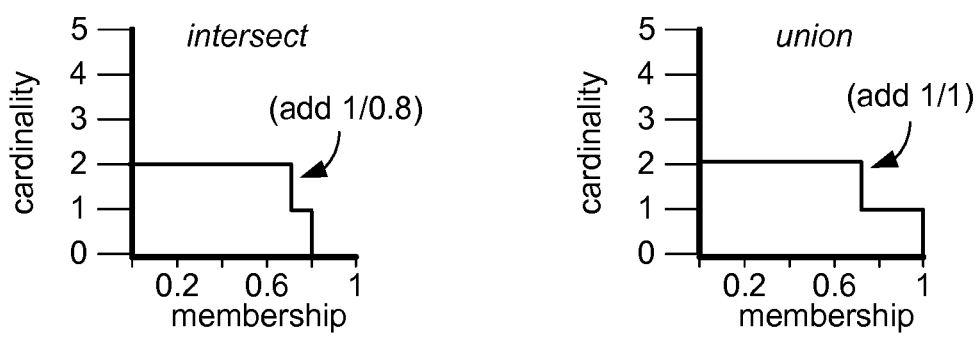
Figure 18C:
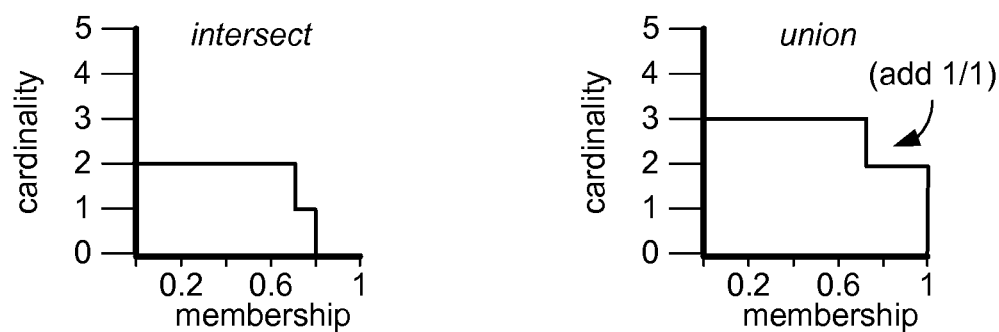
Figure 18D:
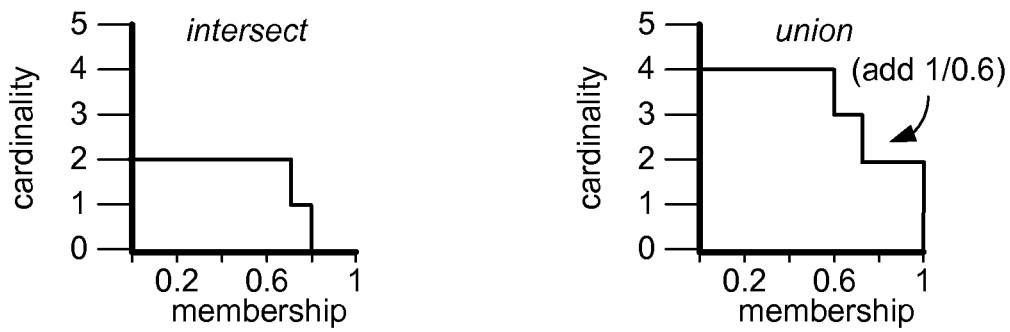
Figure 18E:
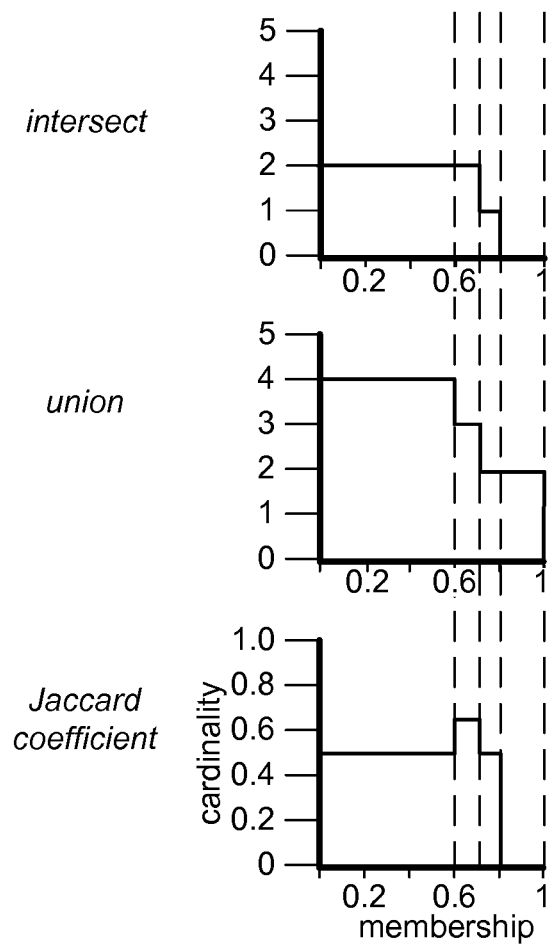

Notably the quotient of xmuIntersectCardinality/xmuUnionCardinality depicted in FIG. 18*e* as the Jaccard coefficient is evaluated by dividing the cardinality of the xmuIntersectCardinality xmu value for each portion of membership by the cardinality of the xmuUnionCardinality xmu value for a corresponding portion of membership (such portions indicated by broken lines between the intersect and union xmu number graphs). Thus, for the portion of membership from membership 0 to membership 0.6, the intersect xmu cardinality of 2 is divided by the union xmu cardinality of 4 to give a Jaccard coefficient cardinality for memberships 0 to 0.6 of 0.5 (2/4=0.5). Similarly, for the portion of membership from 0.6 to 0.7 the intersect xmu cardinality of 2 is divided by the xmu union cardinality of 3 to give a jaccard coefficient cardinality for memberships 0.6 to 0.7 of 0.667 (2/3=0.667).

Figure 19:
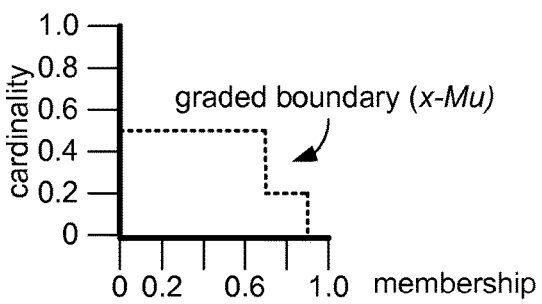
FIG. 19 illustrates an exemplary threshold degree of similarity as a graded boundary for identifying similar entities in accordance with an embodiment of the present disclosure.

Once evaluated, the Jaccard coefficient of similarity can be used to identify pairs of entities exhibiting degrees of similarity at or exceeding a threshold degree. Whereas the Jaccard coefficients of similarity for pairs of entities are xmu numbers, so too the threshold degree of similarity is defined as an xmu number across all degrees of membership. Accordingly FIG. 19 illustrates an exemplary threshold degree of similarity as a graded boundary for identifying similar entities in accordance with an embodiment of the present disclosure. The exemplary graded boundary of FIG. 19 has a cardinality of 0.5 up to a membership of 0.7 and a cardinality of 0.2 between membership 0.7 and 0.9 with a cardinality of 0 after membership 0.9.

Figure 20:
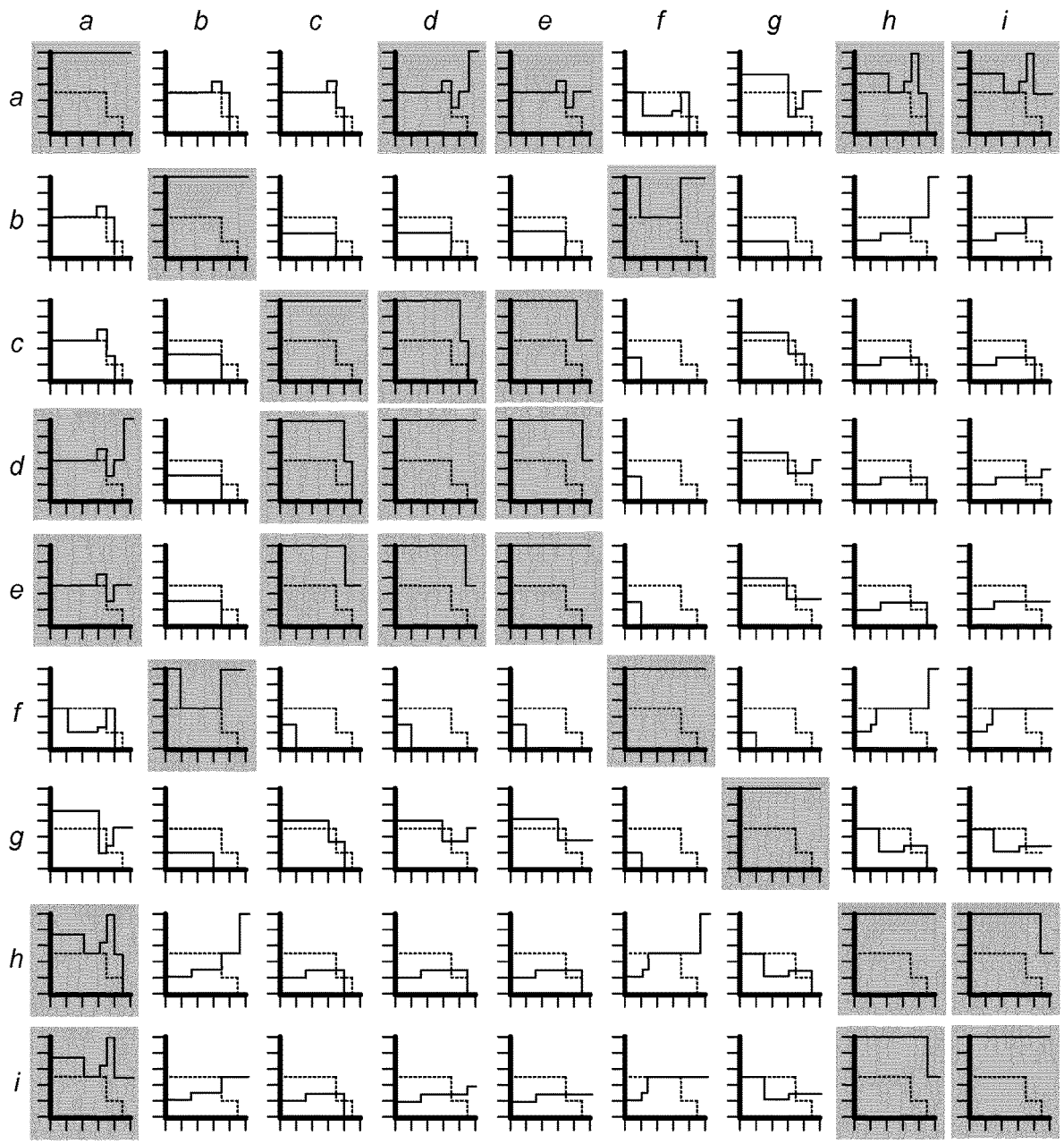
FIG. 20 depicts Jaccard coefficients of similarity as xmu numbers for all possible pairs of entities a to i of Table 3 in accordance with an embodiment of the present disclosure.

FIG. 20 depicts the Jaccard coefficients of similarity as xmu numbers for all possible pairs of entities a to i of table 3 in accordance with an embodiment of the present disclosure. The rows and columns of graphs in FIG. 20 correspond to entities (i.e. employee IDs) a in the top left hand corner. Each xmu Jaccard coefficient of FIG. 20 is generated using the similarity_calculation pseudo code above and is depicted having overlaid the graded boundary of FIG. 19 as a broken line in each xmu graph. Where the entirety of the Jaccard coefficient of similarity for a pair of entities exceeds the graded boundary across all levels of membership then the similarity can be considered significant such as to indicate a relationship of interest or as a basis for a determination of interesting similarity or even to treat entities as identical (for the purposes of their treatment). Thus xmu Jaccard similarity coefficients for pairs of entities identified as sufficiently similar with reference to the graded boundary are indicated with grey shaded background. Note that in practice it is not necessary to evaluate all similarities since the matrix of xmu similarity values are symmetrical about the diagonal at most half such values are required to be evaluated. In an embodiment only a subset of the xmu similarity values are required to be calculated by employing an optimized process for partitioning entities into clusters as described below.

The xmu Jaccard similarities can be used as part of an identification of clusters of entities, where membership to a cluster arises due to a sufficient similarity (based on the graded boundary) with an existing member of the cluster. Notably, membership of the cluster does not constitute equivalence of members since two entities assigned, belonging or partitioned to a cluster may be similar but a third entity, related to one of the initial two entities may be dissimilar to the other one of the initial two entities.

A cluster of entities is represented as a set of fuzzy relations, each relation corresponding to an entity (per FIG. 17). Additionally, maximal relations of a set of fuzzy relations are distinguished according to a natural fuzzy subset ordering. Specifically, if we have two relations represented as:

$$A=\{e_1/m_{a1}, e_2/m_{a2}, \ldots e_n/m_{an}\}$$

$$B=\{e_1/m_{b1}, e_2/m_{b2}, \ldots e_n/m_{bn}\}$$

where m (membership) is 0 for categories not in the set, then $$A<B \text{ if and only if } m_{ai}<=m_{bi} \text{ for all } i$$

Then, for a set of relations $A1, A2, \ldots A_p$ in a cluster, a maximal relation Mmax is one for which no other relation Ai in the cluster satisfies the property Mmax<Ai.

A cluster of entities is thus represented by two sets of entities (each entity having associated its corresponding fuzzy relation): the set of entities having maximal relations; and other entities in the cluster having non-maximal relations. Note that when adding a new entity to a cluster if the new entity's relation is less than an existing maximal relation (using the definition above) then it can be added to the set of entities having non-maximal relations. If it is greater or equal to a maximal relation for an entity it must be added to the set of entities having maximal relations and the existing entity moved to the set of entities having non-relations. Note that this may result on more than one entity in the set of entities having maximal relations.

The pseudo code below provides an exemplary method of a process_entity function for processing an entity having fuzzy relation A.

| Pseudo code: process_entity |
| --- |
| 1 Initialize empty list of similar clusters as cluster_list |
| 2 FOREACH current_cluster in each cluster already defined |
| 2.1    IF A is sufficiently similar to any maximal relation in current_cluster THEN |
| 2.1.1      Add current_cluster to cluster_list |
| 2.2    ENDIF |
| 3 ENDFOR |
| 4 If cluster_list has more than one cluster THEN |
| 4.1    Merge clusters in cluster_list; consolidate cluster_list to only single merged cluster |
| 5 ELSE if cluster_list is empty THEN |
| 5.1    Create new cluster having A as maximal relation |
| 6 ELSE |
| 6.1    Execute update_cluster for the single cluster in cluster_list and for relation A |
| 7 ENDIF |

The process_entity function loops through all currently defined clusters (line 2) and identifies any cluster for which the relation A is sufficiently similar to a maximal relation of the cluster (line 2.1). The sufficient similarity is undertaken using the xmu Jaccard similarity coefficients comparing the relation A with a maximal relation with reference to a predefined graded boundary as previously described. Where multiple similar clusters are identified at line 4 the clusters are merged. Where no cluster is identified at line 5 then a new cluster is generated at line 5.1 having A as the maximal relation. At line 6.1 the relation A is added to an identified cluster with reference to an update_cluster function detailed below.

The pseudo code below outlines an exemplary method for an update_cluster process whereby a cluster of entities is updated based on a new relation for a new entity. The update_cluster method accepts as input a fuzzy relation A corresponding to a new entity; and a cluster consisting of MAXIMAL and NONMAXIMAL sets to which the entity for relation A is to be added (either or both MAXIMAL and NONMAXIMAL sets may be empty). The update_cluster process updates the cluster and returns the updated MAXIMAL and NONMAXIMAL sets.

| Pseudo code: update_cluster |
| --- |
| 1 set ISMAXIMAL to false |
| 2 FOREACH relation R in MAXIMAL set |
| 2.1    IF R < A THEN |
| 2.1.1      set ISMAXIMAL to true |
| 2.1.2      move R to NONMAXIMAL set |
| 2.2    ENDIF |
| 3 ENDFOR |
| 4 IF ISMAXIMAL is true THEN |
| 4.1    add A to MAXIMAL set |
| 5 ELSE |
| 5.1    add A to NONMAXIMAL set |
| 6 ENDIF |
| 7 RETURN {MAXIMAL, NONMAXIMAL sets} |

The general method of the process_entity function will now be considered in use for processing the entities of Table 3 in view of their fuzzy relations illustrated in FIG. 17 and the xmu Jaccard similarity coefficients of FIG. 20. Initially the set of clusters is empty.

1. Consider employee a—there are no clusters, so a new cluster is created as C1=({a}, { }) i.e. maximal entity=a, no other entities.

2. Consider employee b. Similarity to maximal element of C1 (a) is not above threshold (see FIG. 20—the comparison of the relations for b and a shows that the xmu Jaccard similarity coefficient does not meet the threshold defined by the graded boundary). A new cluster, C2, is created with entity b as maximal entity:

$$C1=(\{a\},\{ \})C2=(\{b\},\{ \}).$$

3. Consider employee c. Similarity to maximal relation of C1 (for entity a) is not above threshold and similarity to maximal relation of C2 (for entity b) is also not above threshold (see FIG. 20). A new cluster, C3, is created with entity c as maximal entity:

$$C1=(\{a\},\{ \})C2=(\{b\},\{ \})C3=(\{c\},\{ \}).$$

4. Consider employee d. Employee d is sufficiently similar to maximal relations for C1 (entity a) and C3 (entity c) (see FIG. 20). C1 and C3 are merged as C1. The relation for entity d is not greater or equal to the maximal relations for entities a and c and entity d is added to the NONMAXIMAL set of C1:

$$C1=(\{a , c\},\{d\})C2=(\{b\},\{ \})$$

5. Consider employee e. Employee e is sufficiently similar to a, and c of cluster C1. The relation for entity d is not greater or equal to the maximal relations for entities a and c and entity d is added to the NONMAXIMAL set of C1:

$$C1=(\{a, c\},\{d, e\})C2=(\{b\},\{ \})$$

6. Consider employee f. Employee f is similar only to b of cluster C2. The relation for entity f exceeds the maximal relation for C2 and so entity b of C2 is moved to the NONMAXIMAL set of C2 and f is added to the MAXIMAL set of C2:

$$C1=(\{a, c\},\{d, e\}) C2=(\{f\},\{b\})$$

7. Consider employee g. Employee g is not similar to a, c (C1) or f (C2) so a new cluster is created, C4, with entity g as MAXIMAL:

$$C1=(\{a, c\},\{d, e\}) C2=(\{f\},\{b\}) C4=(\{g\},\{ \})$$

8. Consider employee h. Employee h is not similar to f (C2) or g (C4) but is sufficiently similar to a (see FIG. 20). The relation for entity h does not exceed the MAXIMAL relations for C1 so h is added as NONMAXIMAL:

$$C1=(\{a, c\},\{d, e,h\}) C2=(\{f\},\{b\}) C4=(\{g\},\{ \})$$

9. Consider employee i. Employee i is sufficiently similar to a but does not exceed the MAXIMAL relations for C1 so h is added as NONMAXIMAL:

$$C1=(\{a, c\},\{d, e,h,i\}) C2=(\{f\},\{b\}) C4=(\{g\},\{ \})$$

10. The method can be repeated for other attributes of interest (e.g. building id, day of week, etc.).
11. If required, fuzzy associations between clusters on different attributes can be identified.
12. The DAG can be re-labeled with clusters or clusters+ associations.
13. New event sequences can be checked; sequences that do not conform to the cluster(s) labeling edges can be flagged.

Thus embodiments of the present disclosure provide a mechanism for clustering entities that are not readily associated such as entities having no readily classifiable or categorizable meaning. Once classified embodiments of the disclosure have particular advantages in the identification of entities not belonging to any cluster definition which can be flagged as suspicious entities. Further, entities identified as belonging to a particular cluster that are associated with events that lead to an entity being associated with a different cluster can indicate suspicious activity of the entity. Thus embodiments of the present disclosure are suitable for identifying suspicious sequences of events for entities that are not readily associated or related to each other due, such as entities being identified in or by non-scalar, non-numerical, non-ordinal, non-interval, non-ratio or non-quantitative manner or means.

Some embodiments of the present disclosure are described with respect to physical security such as employee access to buildings. For example embodiments of the disclosure can identify atypical or different behaviors of entities such as employees, buildings or time periods. For example, an employee clustered with many other employees all behaving in a typical manner for an office worker in a fixed location (building) between fixed hours (9 am to 5 pm with 1 hour for lunch, for example) could be readily identified if behavior departed from that associated with the cluster towards behaviors of another cluster (such as shift-workers and/or mobile workers). Further, where such an employee falls outside all clusters such an eventuality can be indicative of suspicious behavior.

In alternative embodiments entities can include computer systems, network attached devices, network endpoints, software applications, computer programs or software agents such that typical behavior of such entities are modeled using embodiments of the present disclosure based on events generated thereby in order to identify behavior and/or events departing from behavior and/or events associated with identified clusters of entities. For example, typical network traffic generated by a network-attached computer system or software application can result in events suitable for embodiments of the present disclosure. Further, user access to systems such as login, logout, duration, resources used and/or accessed, access control requests and the like can generate suitable events for embodiments of the present disclosure.

In one embodiment events generated by communications facilities such as telephony facilities including telephone call information, short message service information, mobile or wireless data service information such as call, message or communication times, types, durations, volumes, frequencies, contents and the like can be consumed by methods of embodiments of the present disclosure.

Figure 21:
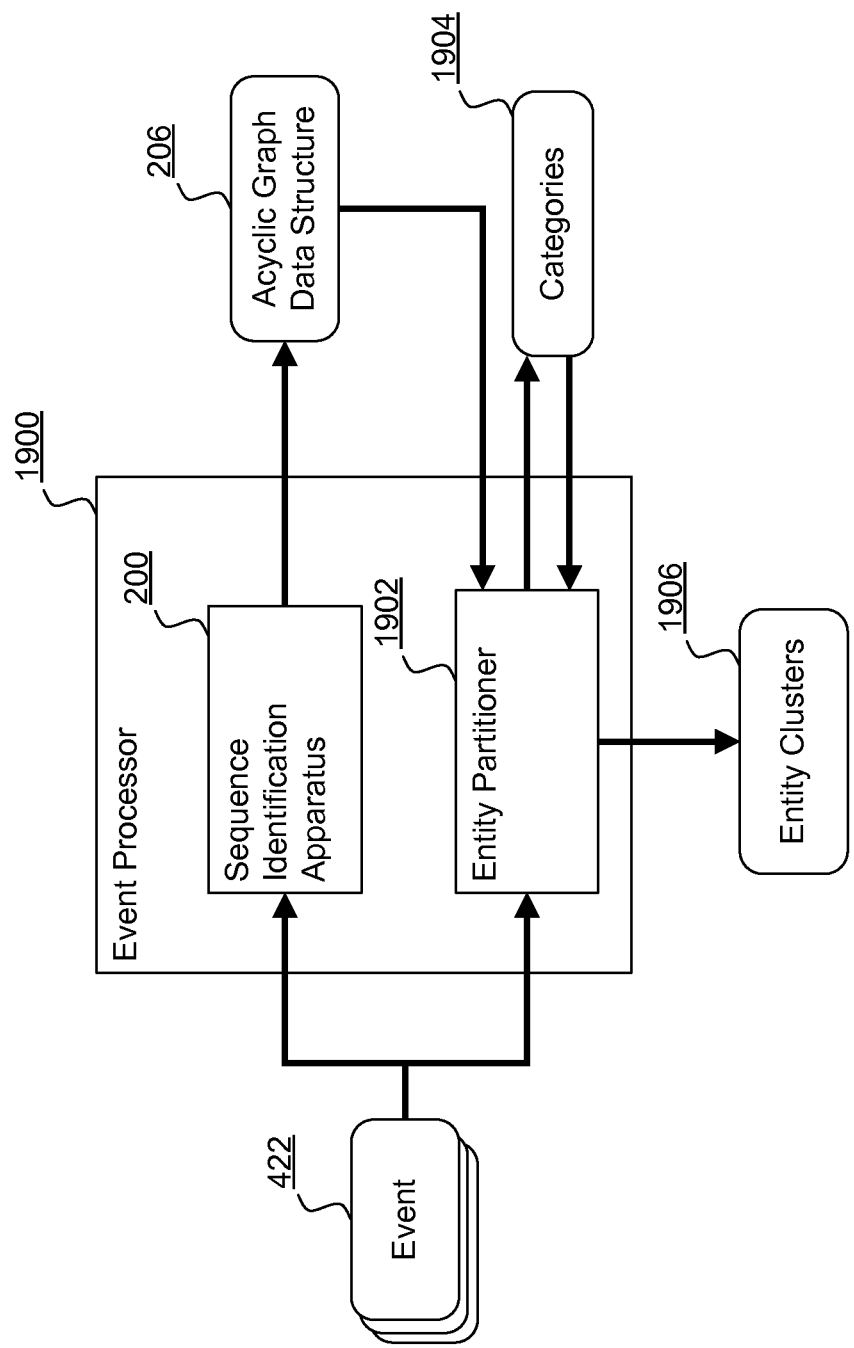
FIG. 21 is a block diagram of an exemplary event processor in accordance with embodiments of the present disclosure.

FIG. 21 is a block diagram of an exemplary event processor 1900 in accordance with embodiments of the present disclosure. The event processor 1900 is a hardware, software, firmware or combination component including a sequence identification apparatus 200 substantially as hereinbefore described, such as with respect to FIGS. 1, 4 and 7. Further, the event processor 1900 includes an event partitioner 1902 as a hardware, software, firmware or combination component suitable for partitioning a set of entities associated with edges in a minimal DAG 206 generated by the sequence identification apparatus 200. The partitioner 1902 partitions the entities into clusters of entities 1906 based on categories of behavior 1904 of the entities. The categories 1904 are defined based on paths through the DAG 206 as hereinbefore described. The operation of the entity partitioner 1902 is substantially as hereinbefore described with reference to the similarity_calculation function, the process_entity function and the update_cluster function, and the methods and techniques described and discussed with reference to FIGS. 15 to 20.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for partitioning a plurality of entities each associated with one or more ordered sequences of events received by a computer system, the method comprising:
    defining a minimal directed acyclic graph data structure representing the one or more ordered sequences of events to define a plurality of categories of behavior of the entities;
    defining a threshold degree of similarity as an xmu number, the xmu number having cardinality that is able to vary across a normalized range;
    defining a relation for each entity including a degree of association of the entity with each of the plurality of categories of behavior;
    defining a cluster of entities as a set of entities comprising a first entity;
    comparing a relation for the first entity with a relation for a second entity to define a xmu Jaccard similarity coefficient for the first and second entities; and
    responsive to the xmu Jaccard similarity coefficient meeting the threshold degree of similarity, adding the second entity to the cluster.

2. The method of claim 1, wherein the xmu Jaccard similarity coefficient is a first xmu Jaccard similarity coefficient, and the method further comprises:
    comparing a relation for a third entity with a relation for one or more of the first or second entities to define one or more further xmu Jaccard similarity coefficients; and
    adding the third entity to the cluster in response to one or more of the further xmu Jaccard similarity coefficients meeting the threshold degree of similarity.

3. The method of any preceding claim 1, wherein each category of behavior is defined based on a path through the minimal directed acyclic graph data structure from a start node in the minimal directed acyclic graph data structure to an end node in the minimal directed acyclic graph data structure.

4. The method of claim 1, wherein the relation for each entity includes a measure of membership of the entity with each of the categories.

5. The method of claim 4, wherein each measure of membership for an entity with a category is determined based on a frequency of events associated with the entity that correspond to a path in the directed acyclic graph data structure defining the category.

6. The method of claim 1, further comprising:
    receiving sequences of subsequent events for the first entity;
    updating the minimal directed acyclic graph data structure to additionally represent the sequences of subsequent events to define a plurality of categories of behavior of the entities;
    redefining the relation for the first entity including a degree of association of the first entity with each of the categories;
    comparing the redefined relation for the first entity with one or more of the original relation for the first entity and the relation of the second entity to define one or more xmu Jaccard similarity coefficients; and
    responsive to the xmu Jaccard similarity coefficient failing to meet the threshold degree of similarity, identifying the first entity as a suspicious entity.

7. A computer system comprising:
    a memory; and
    a processor, wherein the processor is adapted to perform a method for partitioning a plurality of entities each associated with one or more ordered sequences of events received by a computer system, the partitioning comprising:
    defining a minimal directed acyclic graph data structure representing the ordered sequences of events to define a plurality of categories of behaviour behavior of the entities;
    defining a threshold degree of similarity as an xmu number, the xmu number having cardinality that is able to vary across a normalized range;
    defining a relation for each entity including a degree of association of the entity with each of the categories;
    defining a cluster of entities as a set of entities comprising a first entity;
    comparing a relation for the first entity with a relation for a second entity to define a xmu Jaccard similarity coefficient for the first and second entities; and
    responsive to the xmu Jaccard similarity coefficient meeting the threshold degree of similarity, adding the second entity to the cluster.

8. A non-transitory computer-readable storage medium storing a computer program element comprising computer program code to, when loaded into a computer system and executed thereon, cause the computer to perform the computer implemented method as claimed claim 1.

* * * * *